(12) United States Patent
Yasuda

(10) Patent No.: US 6,549,178 B2
(45) Date of Patent: *Apr. 15, 2003

(54) COMMUNICATION TERMINAL APPARATUS

(75) Inventor: Hitoshi Yasuda, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/402,023

(22) Filed: Mar. 10, 1995

(65) Prior Publication Data

US 2001/0040532 A1 Nov. 15, 2001

(30) Foreign Application Priority Data

| Mar. 11, 1994 | (JP) | ............................................. 6-068005 |
| Jun. 16, 1994 | (JP) | ............................................. 6-158149 |
| Feb. 2, 1995 | (JP) | ............................................. 7-037664 |

(51) Int. Cl.$^7$ .................................................. G09G 5/00
(52) U.S. Cl. ........................... 345/2.1; 345/1.1; 709/204
(58) Field of Search ............................ 345/1, 2, 3, 146, 345/115, 342, 340, 1.1, 1.2, 1.3, 2.1, 2.2, 2.3, 3.1, 3.4; 395/153, 157, 159, 200.04; 348/14, 15; 379/96, 204, 205, 206; 709/204, 205, 227

(56) References Cited

U.S. PATENT DOCUMENTS

| 4,953,159 A | * | 8/1990 | Hayden et al. .............. 379/204 |
| 4,974,173 A | * | 11/1990 | Stefik et al. ................. 395/157 |
| 5,008,853 A | * | 4/1991 | Bly et al. .................... 395/153 |
| 5,060,170 A | * | 10/1991 | Bourgeois et al. ........... 345/342 |
| 5,195,086 A | * | 3/1993 | Baumgartner et al. ....... 379/202 |
| 5,247,615 A | * | 9/1993 | Mori et al. ............. 395/200.04 |
| 5,373,549 A | * | 12/1994 | Bales et al. .................... 379/96 |
| 5,375,068 A | * | 12/1994 | Palmer et al. .............. 395/153 |
| 5,418,560 A | | 5/1995 | Yasuda ......................... 348/14 |

\* cited by examiner

*Primary Examiner*—Xiao Wu
(74) *Attorney, Agent, or Firm*—Fitzpatrick, Cella, Harper & Scinto

(57) ABSTRACT

There is provided a communication terminal, capable of displaying the image data of an arbitrary location, or those of arbitrary multiple locations in collective manner, on the display device, in the multi-location communication, and also capable of displaying the state of connection of the communication terminals. Also provided is a communication terminal capable of preventing the confusion in communication, resulting from an erroneous line disconnection in the multi-location communication.

17 Claims, 19 Drawing Sheets

SHIFT TO DISPLAY SET MODE BY "ENTER" KEY →

DISPLAY MODE SETTING WINDOW POPS UP

SHIFT CURSOR BY ARROW KEY FROM OPERATION UNIT (DESIGNATE MODE WITH "SPACE" KEY)

COMMUNICATING IN FOUR LOCATIONS

| DISPLAY LOCATION | A | B | C | D | ← DISPLAYED LOCATION |
| DISPLAY POSITION | ▦ | ▦ | ▦ | ▦ | ← DISPLAYED POSITION |

* SELECT LOCATIONS A, B, D

TO FIG. 3D    TO FIG. 3E

FIG. 3E
| COMMUNICATING IN FOUR LOCATIONS | | | | |
|---|---|---|---|---|
| DISPLAY LOCATION | A | B | C | D |
| DISPLAY POSITION | ▨ | ▨ | ▨ | ▨ |
* SELECT ONLY LOCATION D
DETERMINE DISPLAY MODE
BY "ENTER" KEY
FROM FIG. 3B    FROM FIG. 3C
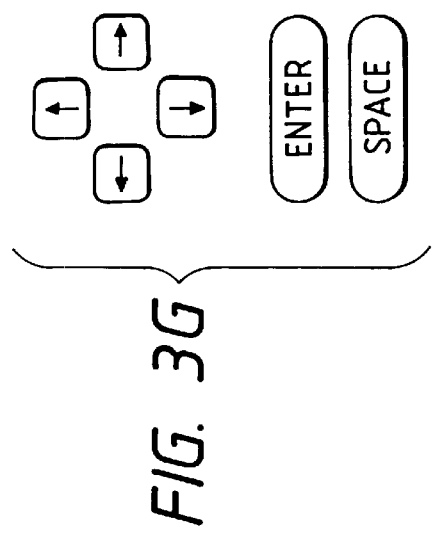
FIG. 3G
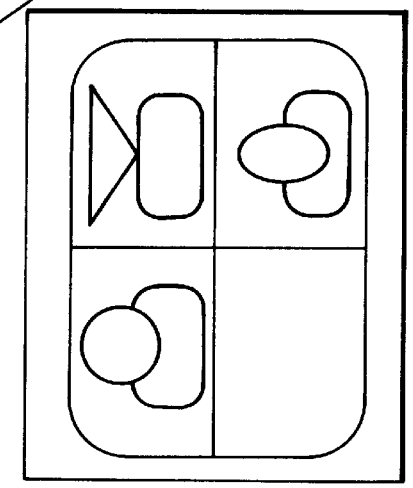
FIG. 3D
BLUE BACK, etc. IS DISPLAYED
IN WINDOW WHICH IS NOT
SELECTED AND DISPLAYED
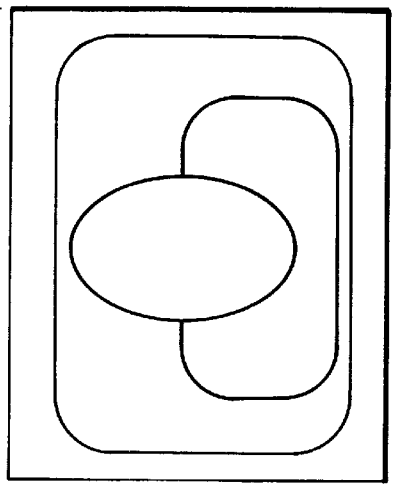
FIG. 3F
FULL SCREEN DISPLAY IS
PERFORMED UPON ONE
LOCATION DISPLAY

COMMUNICATION TERMINAL APPARATUS

BACKGROUND OF THE INVENTION

1. Field of the Invention

The present invention relates to a communication terminal apparatus for communication among multiple locations.

2. Related Background Art

Efficacy of communication terminals utilizing communication channels, such as television conference terminals, is attracting attention in recent years, from the standpoint of reduction of costs of business trips and of effective utilization of time. Also, there is being developed a multi-point television conference system with multi-point function for conducting a conference among multiple locations, in addition to point-to-point function for conducting a conference between two points.

In such multi-point television conference system, the communication among multiple locations is generally realized by a multi-point control unit (MCU), but there is recently developed a system capable of realizing the communication among multiple locations without the MCU, by connecting plural information channels to the different television conference terminals and connecting the information channels so as to form a loop or a bus.

In such television conference system, in the point-to-point mode, various display modes may be realized on each display unit such as (1) display of a received image over the entire image frame, (2) graphic display over the entire image frame, with a window display therein of the received image, or (3) combined display of the own image and the received image on graphic display, and such initial setting may also be suitably varied. Also in the multi-point mode, there can be increased the number of received images to be displayed, in addition to the display modes in case of the point-to-point mode.

FIG. 4 is a block diagram of such conventional multi-point television conference terminal, wherein a camera 1, serving as the image input means of the terminal, is used for entering the image of the user of this terminal or a drawing. A display unit 2, for displaying the input image data from the camera 1 or the image data received from another terminal, is composed for example of a CRT (cathode ray tube) or a LCD (liquid crystal display device). A video input interface unit 3 effects switching of the image input means (camera 1), A/D (analog-to-digital) conversion of the image data, conversion of image data size, transformation of image data format, etc. under the control of a system control unit 11 to be explained later.

A video output interface unit 4 is composed of a received image scaling unit 4a for converting the image size of received image data, an image memory unit 4b for temporarily storing the image data at the image size conversion by the received image scaling unit 4a, an image memory control unit 4c for controlling the image data write-in and image data read-out from the image memory unit 4b, and a TV signal encoding unit 4d for converting the image data, read from the image memory unit 4b, into television (TV) signals under the control of said image memory control unit 4c.

A video encode/decode unit 5, for encoding the transmission image signal and decoding the received image signal according to the recommendation H.261 of ITU-T (former CCITT: Consultation Committee for International Telegraph and Telephone), is composed of a video encoding unit 5a and a video decoding unit 5b. There are also provided a handset 6 serving as voice input/output means of the present terminal, a microphone/speaker 7 serving as another voice input/output means of the present terminal, and an voice input/output interface unit 8 for effecting echo cancellation in the use of the handset 6 or the microphone/speaker 7, generation of various tones, such as dialling tone, calling tone, busy tone, call arrival tone, etc., and switching of the voice input/output means (handset 6 and microphone/speaker 7) under the control of the system control unit 11.

A voice encode/decode unit 9, composed of a voice encoding unit 9a and a voice decoding unit 9b, effects encoding of the transmission voice signal and decoding of the received voice signal according to voice encoding/decoding algorithms such as 64 kbps PCMA-law, 64 kbps PCMµ-law, 64 kbps/56 kbps/48 kbps SB-ADPCM, 32 kbps ADPCM, 16 kbps (for example, LD-CELP) or 8 kbps under the instruction by the system control unit 11. An input unit 10, for entering control information for the entire control of the present terminal, is composed of a keyboard, a touch panel, a mouse, etc.

A system control unit 11 is provided with a CPU (central processing unit), a ROM (read-only memory), a RAM (random access memory), an auxiliary memory device, etc. and serves to monitor the status of various units, to prepare a display image according to the state of control of the entire terminal and to effect the execution of the application program. A demultiplex/multiplexing unit 12 effects multiplexing the voice signal from the voice encoding unit 9a, the image signal from the video encoding unit 5a and the control signal from the system control unit 11 in the unit of each transmission frame according to the ITU-T recommendation H.261 and demultiplexing of each received frame into the constituting media for transmission to various units. There are also shown a line interface unit 13 for line control according to an ISDN user network interface, and a communication line 14 such as ISDN.

In the following there will be explained the function of the multi-point television conference terminal of the above-explained configuration.

Input image from the camera 1 is supplied through the video input interface unit 3 to the video encoding unit 5a. Also, input voice from the handset 6 or the microphone/speaker 7 is supplied through the voice input/output interface unit 8 to the voice encoding unit 9a. The input image encoded in the video encoding unit 5a, the input voice encoded in the voice encoding unit 9a, and a control signal from the system control unit 11 are multiplexed in the unit of each transmission frame by the demultiplex/multiplexing unit 12, and are supplied through the line interface unit 13 to the communication line 14.

A received frame from the communication line 14 is transmitted through the line interface unit 13 and separated in the demultiplex/multiplexing unit 12 into the image signal, voice signal and control signal, which are respectively supplied to the video decoding unit 5b, the voice decoding unit 9b and the system control unit 11. The received image data, decoded in the video decoding unit 5b, are transmitted through the video output interface unit 4 and displayed on the display unit 2. Also, the received voice, decoded in the voice decoding unit 9b, is transmitted through the voice input/output interface unit 8 and is released from the handset 6 or the microphone/speaker 7.

The function of the video output interface unit 4 will be explained in further details. The received image data, decoded in the video decoding unit 5b, are stored in the image memory unit 4b. The received image data have a certain image size for each frame. The image size scaling is unnecessary if the image size is equal to that of the TV monitor of the display unit 2, but the image sizes are usually different. In order to mutually match the image sizes, the received image data stored in the image memory unit 4b are read under the control of the image memory control unit 4b according to the method of image size conversion and are supplied to the received image scaling unit 4a.

The received image scaling unit 4a effects conversion of the image size according to a predetermined method, and the converted image data are stored in the image memory unit 4b again under the control of the image memory control unit 4c. The image data, thus stored in the image memory unit 4b, has an image size equal to that of the TV monitor. The image data, stored in the image memory unit 4b with the display image size of the TV monitor, are read under the control of the image memory control unit 4c and are supplied to the TV signal encoding unit 4d, which effects signal conversion and addition of various synchronization signals and burst signals, for enabling display on the TV monitor, thereby forming TV signals. In this manner the received image data are displayed on the TV monitor of the display unit 2.

In the following there will be explained a specific example of the function of such video output interface unit 4. For example, in the encoding method based on the ITU-T recommendation H.261, the frame size of the received image data is either in the FCIF mode of 352×288 pixels or in the PCIF mode of 176×144 pixels. In the following there will be considered a conversion method for displaying on a NTSC-TV monitor. FIG. 5 shows the concept of function, wherein image data of 352×288 pixels are stored in the image memory unit 4b. A horizontal line of 352 pixels is read, and dummy data (for example, black level data) of 4 pixels are added to each end to obtain data of 360 pixels. Then, between every two neighboring pixels, there is inserted a pixel of a value equal to the additive average of those of pixel of a value equal to the additive average of those of the two neighboring pixels. Finally, a dummy pixels (for example of black data) is added to the right-hand end. In this manner completed is the conversion from 352 pixels to 720 pixels.

The conversion for the vertical lines is conducted in the following manner. Since the TV monitor effects display by interlaced scanning, the 288 lines in the vertical direction are converted into 480 lines of a frame by line interpolation (insertion of 2 lines for every 3 lines), and the 480 lines are divided by the odd-numbered and even-numbered lines into two fields, for supply to the TV signal encoder 4d. It is also possible to prepare the data of a field by skipping 288 lines to 240 lines (by skipping 1 line for every 6 lines) and to repeat the same field twice at the interlaced scanning display. However, the deterioration of the image quality becomes conspicuous in case the same field is repeated twice because every two lines are the same in the display on the TV monitor, so that interpolation or filtering may be used in combination at the display of each field.

The above-explained conversion process enables the display of the image data of 352×288 pixels on the TV monitor. Naturally, other methods are also available for conversion.

FIGS. 6 to 8 illustrate the mode of multi-point television conference utilizing a multi-point control unit (MCU) 16, which is connected, through communication lines 14 and a network 17, directly with multi-point television conference terminals (1st to 4th terminals in FIGS. 6 to 8) of multiple locations to participate in the communication (cf. FIG. 6), and which synthesizes or selects the image data received from the locations, reconstructs the image data and distributes the image data to the multi-point television conference terminal at multiple locations. The multi-point television conference terminal of each location receives the image data distributed from the MCU 16 and displays, on the TV monitor constituting the display unit 2, an image corresponding to the received image data. Thus, if the received image data are limited to those of only one location, such image data of one location alone are displayed on the TV monitor (FIG. 7). On the other hand, if the received image data are synthesized from those of multiple locations, the image data of such multiple locations are displayed on the TV monitor (FIG. 8). Thus, each multi-point television conference terminal depends on the MCU 16 with respect to the display of the image data on the TV monitor, without any particular process on the side of the terminal.

In the conventional communication terminal apparatus such as the multi-point television conference terminal explained above, source locations are not identified in the image data of multiple locations at the display of the received image data on the TV monitor, so that it has not been possible to display, on the TV monitor, the image data of an arbitrary location or arbitrarily selected plural locations.

Also in the conventional multi-point television conference terminal explained above, in case of multipoint communication for receiving the image data of multiple locations by plural frames, it has been impossible not only to display the image data of an arbitrary location only on the TV monitor but also to collectively display the received image data of multiple locations on the TV monitor.

Another configuration of the television conference system consists, as shown in FIG. 8, of a loop-shaped connection of the lines 14 among the television conference terminals of multiple locations. In such television conference with the loop-shaped line connection, the display on the monitor of each terminal is conducted according to the initial setting, regardless of the state of connections of the multiple locations. Therefore, from the display windows on the display unit, showing the images from the multiple locations, the observer can know the participants connected to the system but cannot know the state of connection as a loop or a bus.

Such drawback is not limited to the television conference system but can occur likewise in the telephone conference for transmitting the voice only.

SUMMARY OF THE INVENTION

In consideration of the foregoing, an object of the present invention is to provide a communication terminal capable of resolving the drawbacks mentioned above.

Another object of the present invention is to provide a communication terminal capable of displaying the image of an arbitrary location, among the received images of multiple locations.

Still another object of the present invention is to provide a communication terminal capable of allowing display of the identification of the mode of connection of the communication terminals.

The foregoing objects can be attained, according to a preferred embodiment of the present invention, by a communication terminal apparatus for effecting communication among multiple locations by displaying image data on display means, comprising input means for entering information for designating image data of an arbitrary location, among the image data of the multiple locations, and control means for effecting control so as to display, on the display means, the image data of a location corresponding to the information entered by the input means.

Still another object of the present invention is to provide a communication terminal provided with novel functions.

Still other objects of the present invention, and the features thereof, will become fully apparent from the following detailed description, to be taken in conjunction with the attached drawings.

BRIEF DESCRIPTION OF THE DRAWINGS

FIGS. 3A to 3G are views showing an example of operations for setting the display mode in the communication terminal;

DETAILED DESCRIPTION OF THE PREFERRED EMBODIMENTS

[First embodiment]

In the following there will be explained a first embodiment of the present invention, with reference to FIGS. 1 to 3.

Figure 1:
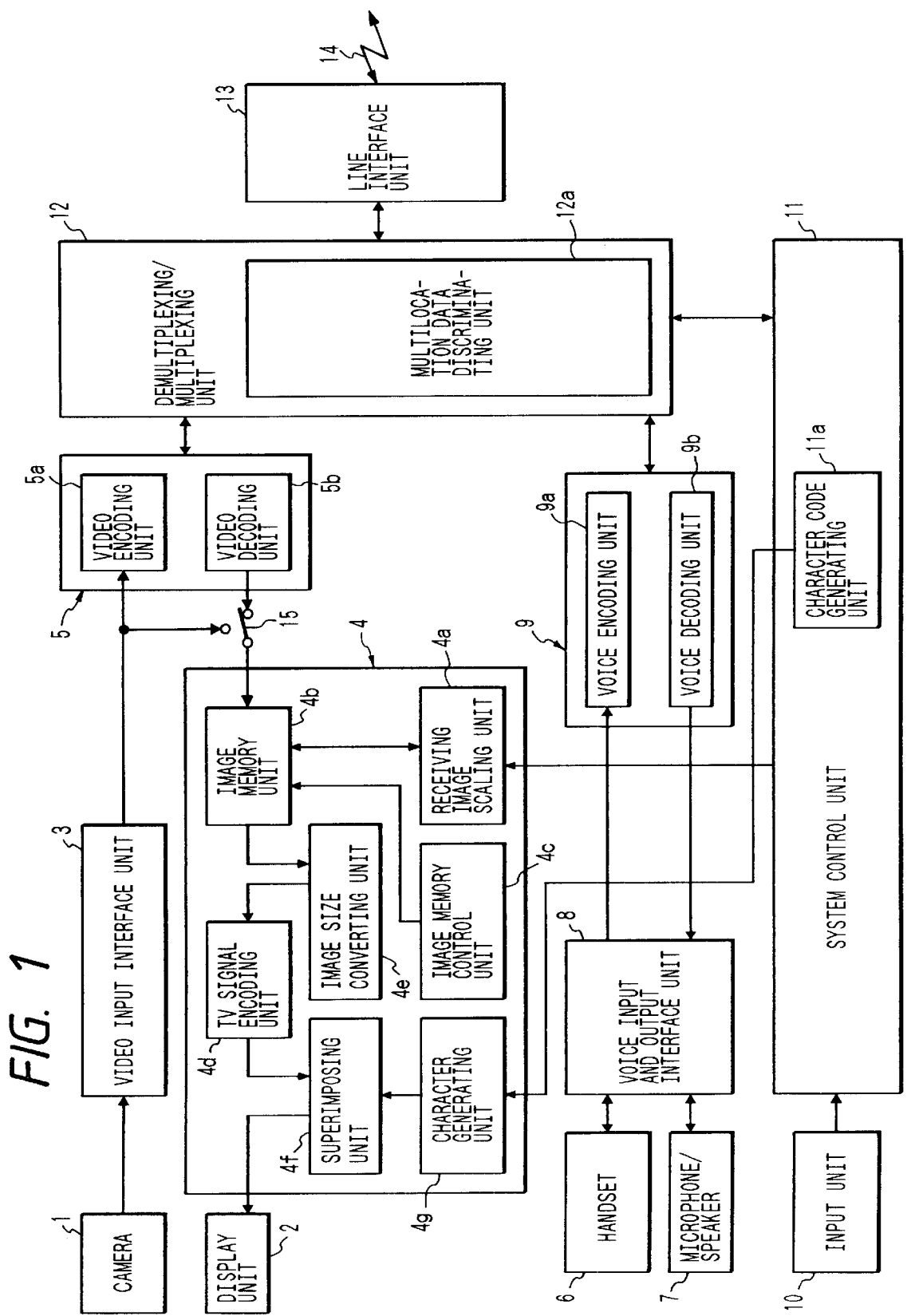
FIG. 1 is a block diagram of a communication terminal constituting an embodiment of the present invention.
Figure 4:
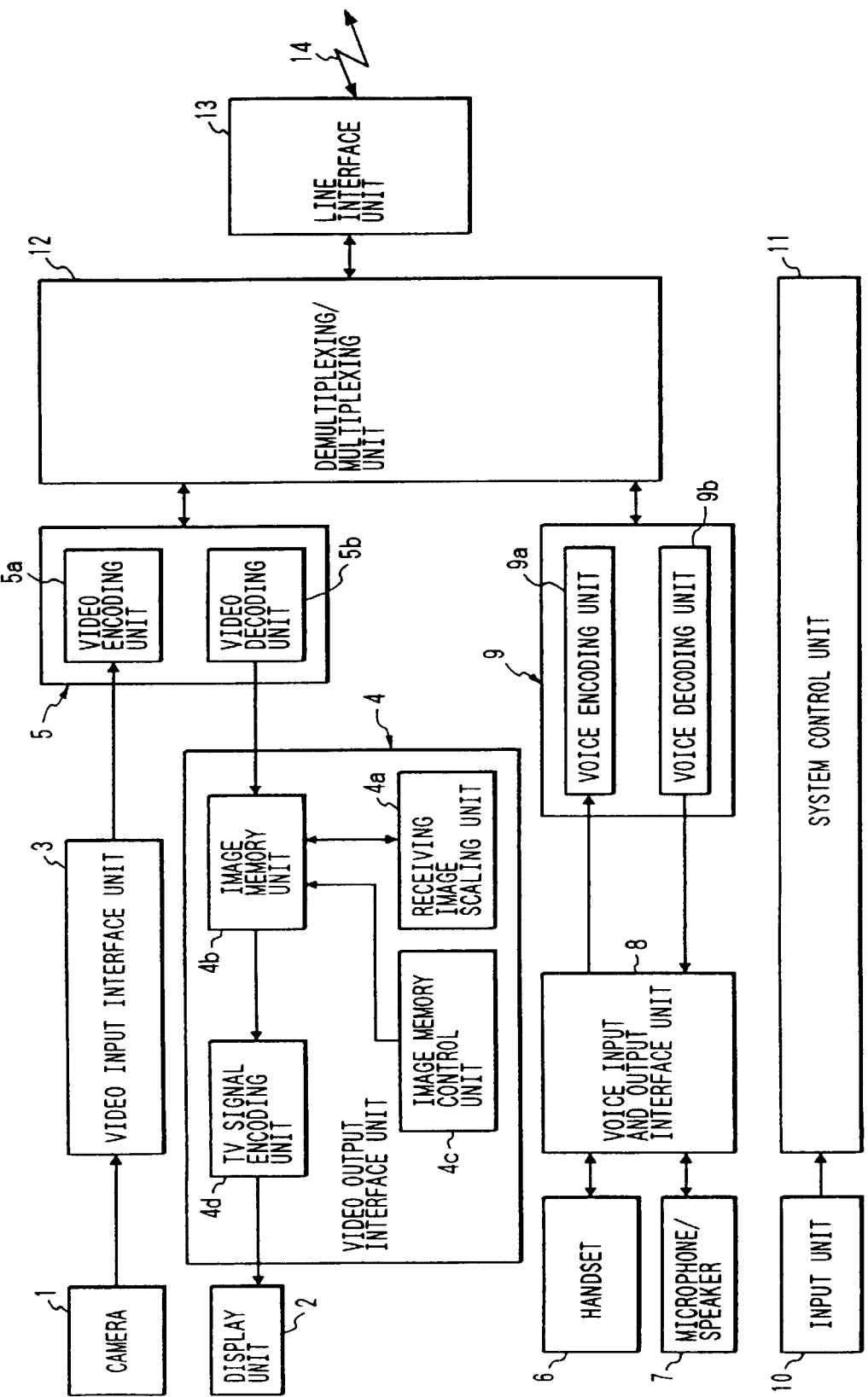
FIG. 4 is a block diagram of a conventional communication terminal.
Figure 5:
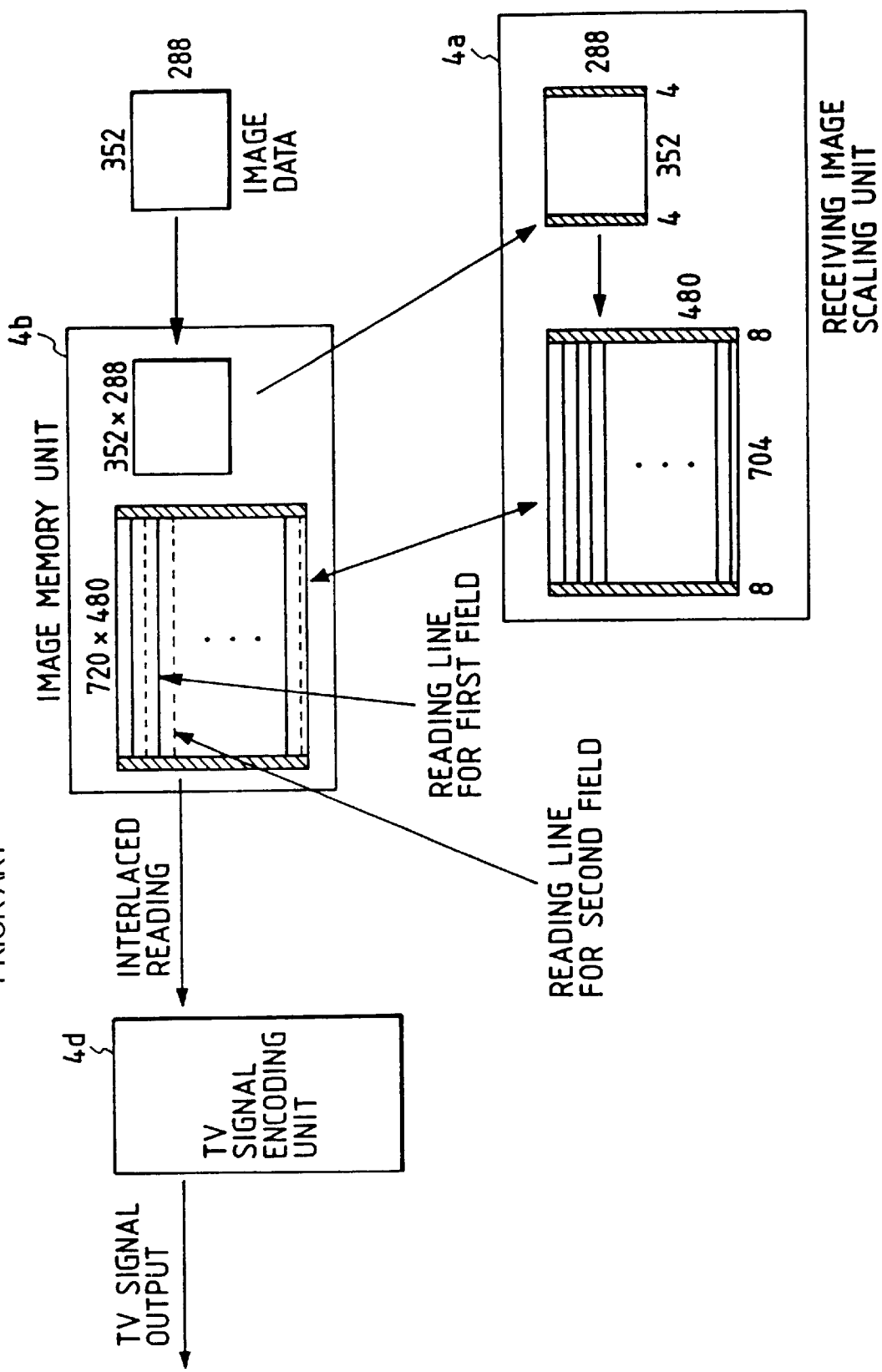
FIG. 5 is a view showing the function of a video output interface unit in the conventional communication terminal.
Figure 6:
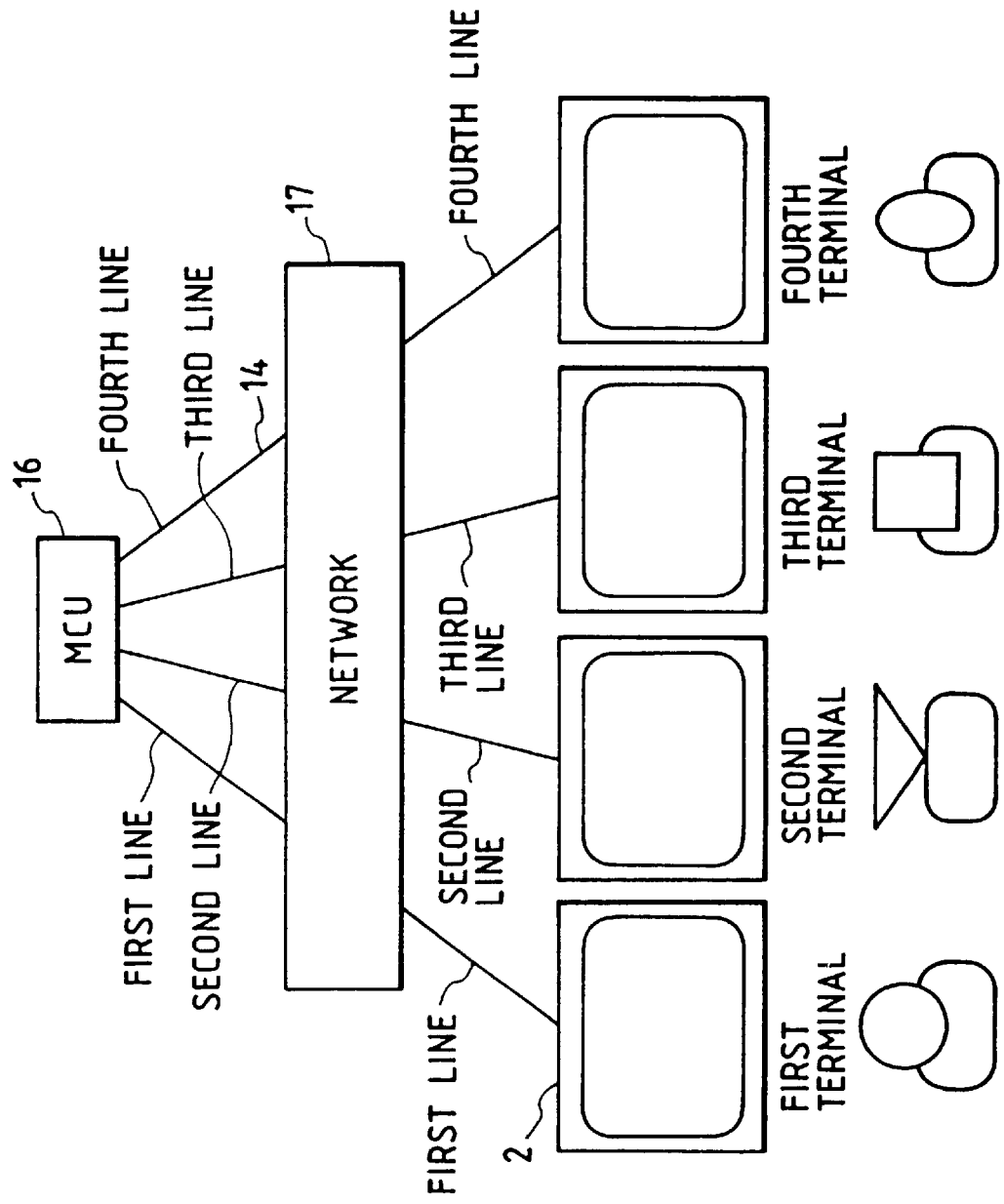
FIGS. 6 to 8 are views showing example of image display in the conventional multi-point television conference terminals.
Figure 7:
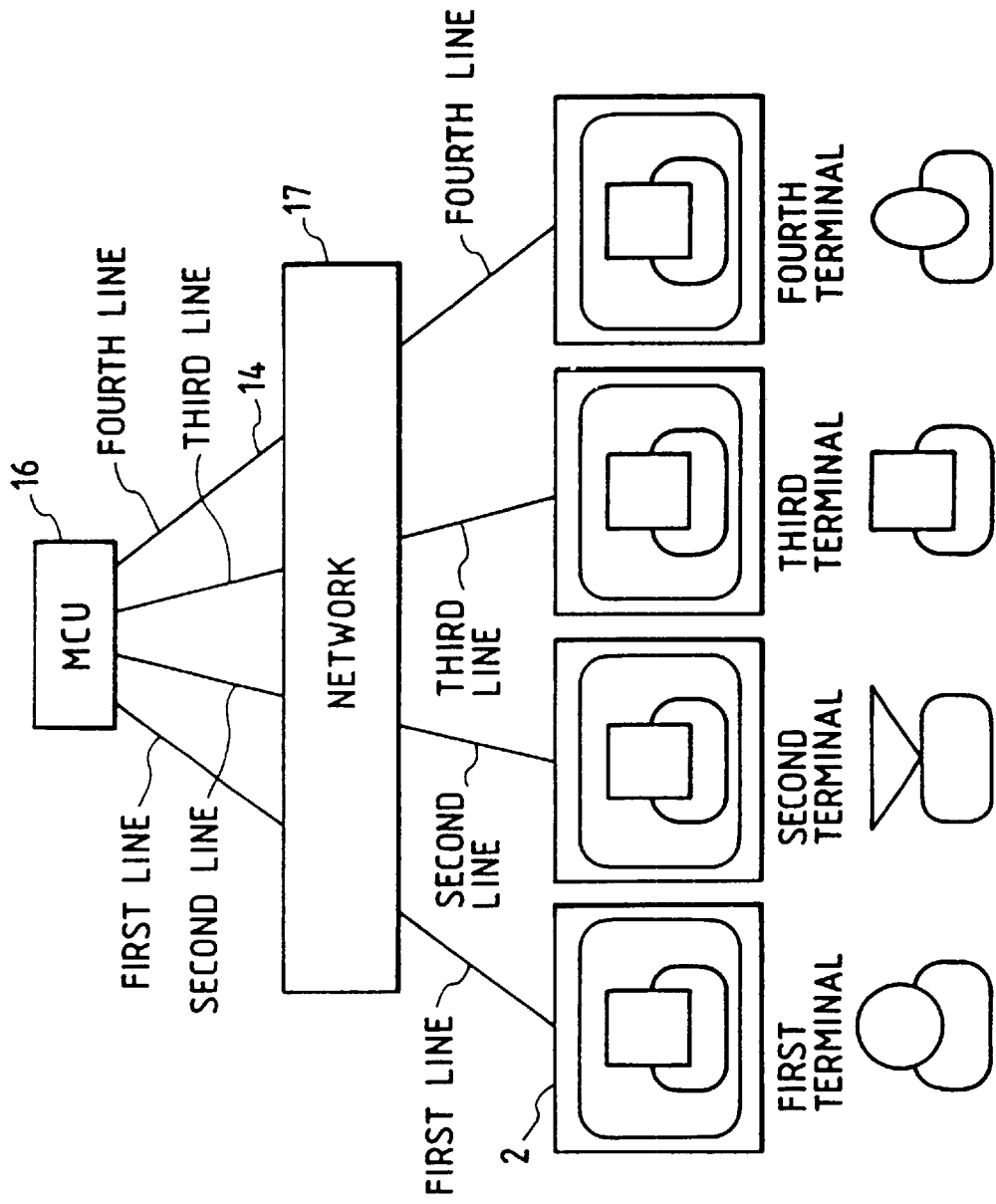
Figure 8:
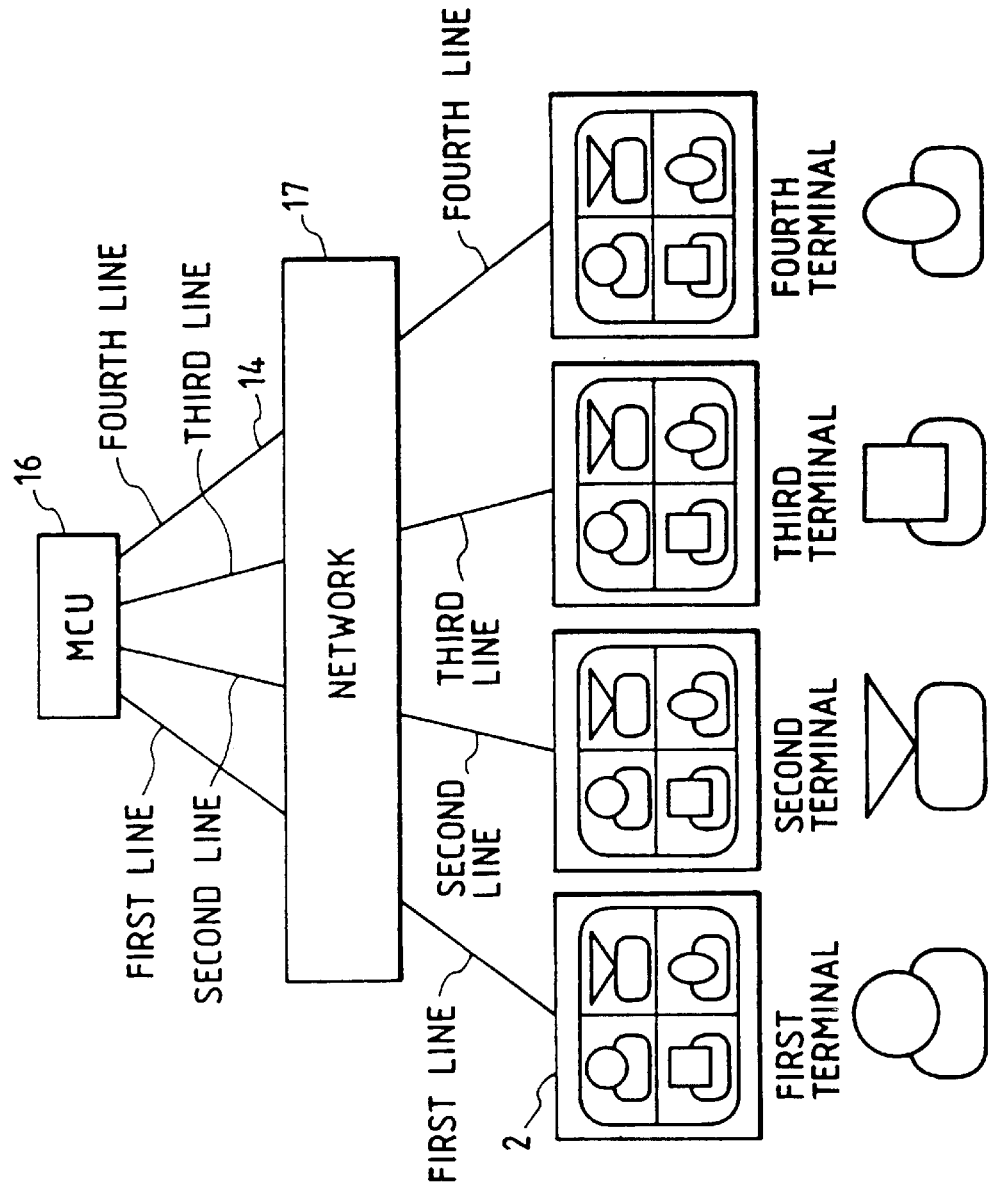

FIG. 1 is a block diagram showing the configuration of a multi-point television conference terminal which is a communication terminal embodying the present invention, wherein the same components as those in the conventional configuration shown in FIG. 4 are represented by the same numbers. The configuration shown in FIG. 1 is different from that in FIG. 4 in further comprising a multi-location data discriminating unit 12a, an image size conversion unit 4e, a superimpose unit 4f, a character generation unit 4g, a character code generation unit 11a and a high-speed video switch 15.

The multi-location data discrimination unit 12a is provided in the demultiplex/multiplexing unit 12 and serves to discriminate, among the received image data of multiple locations, those of each location, for transmission to the system control unit 11 which stores, in a RAM therein, the data discriminating information received from the multi-location data discrimination unit 12a. The image size conversion unit 4e is provided between the image memory unit 4b and the TV signal encoding unit 4d and serves to convert the size of the image data read from the image memory unit 4b. The superimposing unit 4f is provided between the TV signal encoding unit 4d and the display unit 2 and serves to synthesize the TV signal released from the TV signal encoding unit 4d with the character information from the character generation unit 4g. The character code generation unit 11a is provided in the system control unit 11 and serves to generate, for supply to the character generation unit 4g, a character code of the character to be generated, according to the control information supplied from the input unit 10. The high-speed video switch 15 serves to enter the transmission image data into the image memory unit 4b, in order to enable display of the transmission image data also on the display unit 2.

In the following there will be explained the function of the multi-point television conference terminal of the present embodiment.

An input image from the camera input unit 1 is supplied, through the video input interface unit 3, to the video encoding unit 5a. Also, input voice from the handset 6 or the microphone/speaker 7 is supplied, through the voice input/output interface unit 8, to the voice encoding unit 9a. Then the input image encoded in the video encoding unit 5a, the input voice encoded in the voice encoding unit 9a and the control signal from the system control unit 11 are multiplexed in the unit of a transmission frame in the demultiplex/multiplexing unit 12, and are transmitted through the line interface unit 13 to the communication line 14.

Also, a frame received from the communication line 14 is transmitted through the line interface unit 13 and separated in the demultiplex/multiplexing unit 12 into an image signal, a voice signal and a control signal for respective supply to the video decoding unit 5b, the voice decoding unit 9b and the system control unit 11. The received image, decoded in the video decoding unit 5b, is transmitted through the high-speed video switch 15 and the video output interface unit 4 and displayed on the display unit 2. Also, the received voice, decoded in the voice decoding unit 9b, is transmitted through the voice input/output interface unit 4 and is released from the handset 6 or the microphone/speaker 7. As the transmission image data can also be fetched by the high-speed video switch 15, the display unit 2 can display the transmission image data as well as the received image data.

Figure 2A:
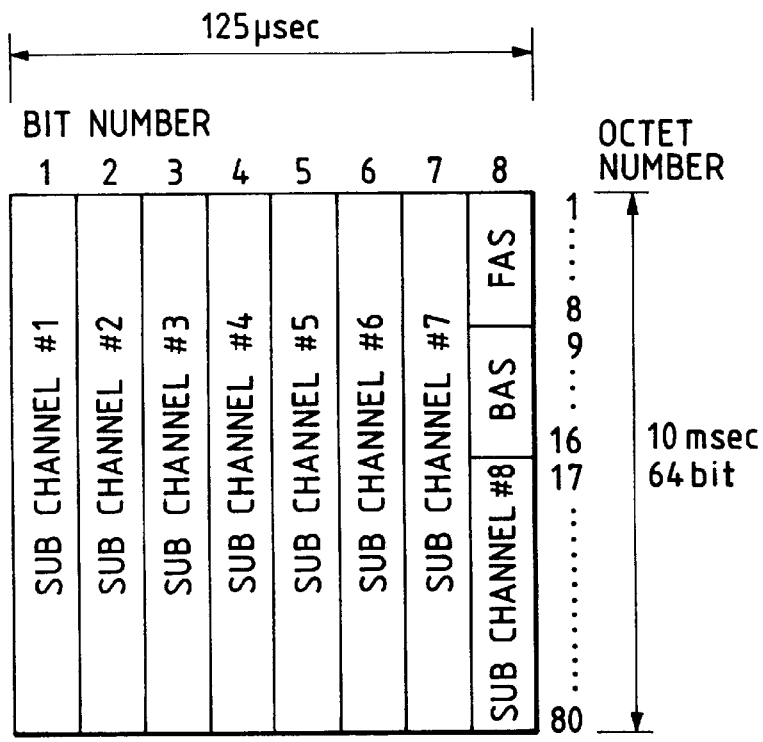
FIGS. 2A to 2D are views showing an example of the structure of communication farm in the communication terminal.
Figure 2B:
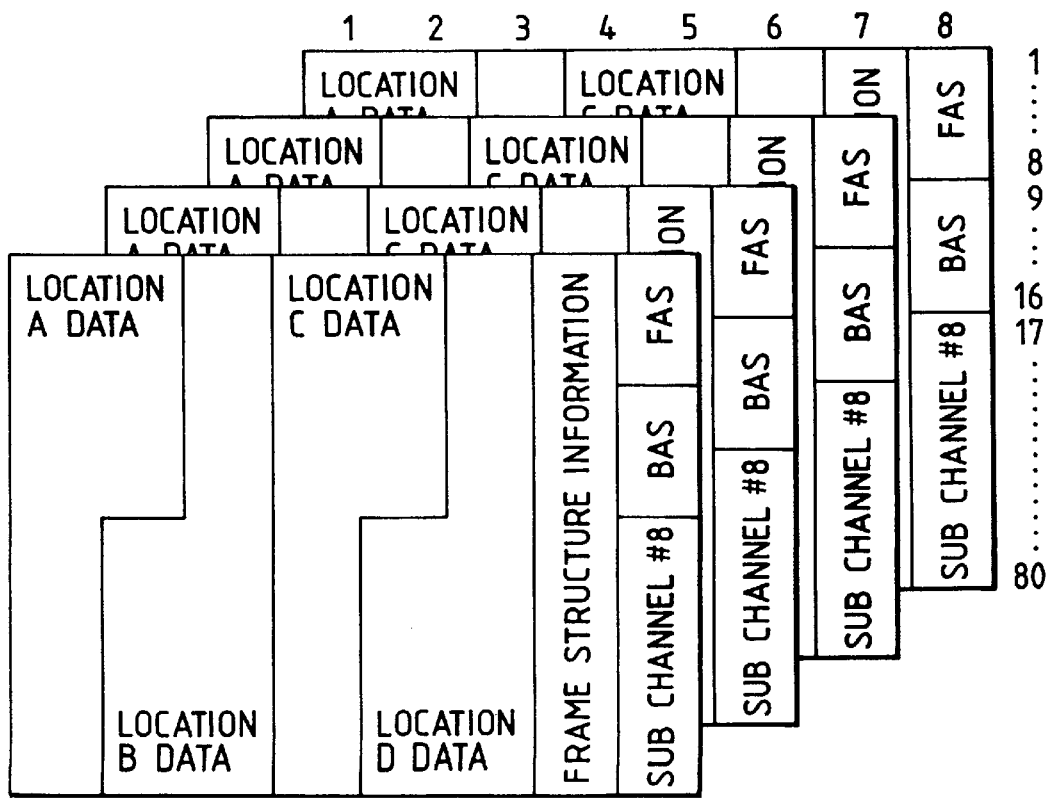

The multi-location data discrimination unit 12a searches the received frame, and discriminates the locations of the data, even in case the data of multiple locations are contained within the same frame. FIGS. 2A to 2D show examples of the frame structure. FIG. 2A shows the known frame structure of 64 kbps channels (B channels) according to the ITU-T recommendation H.221. FIG. 2B shows a unique frame structure in which each frame contains data of four locations and remains the same in time in structure.

Figure 2C:
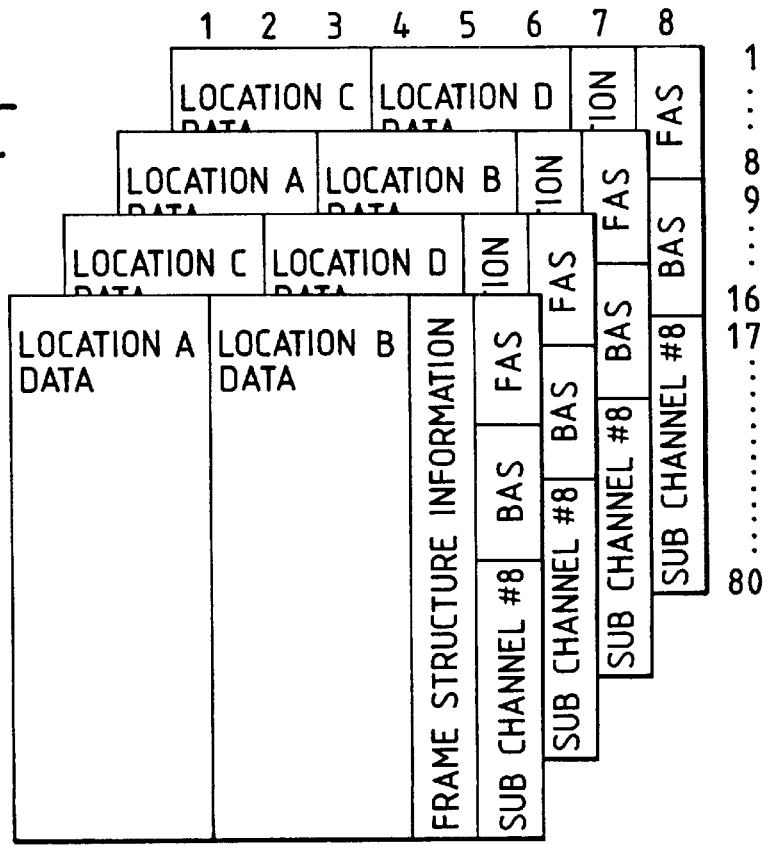
Figure 2D:
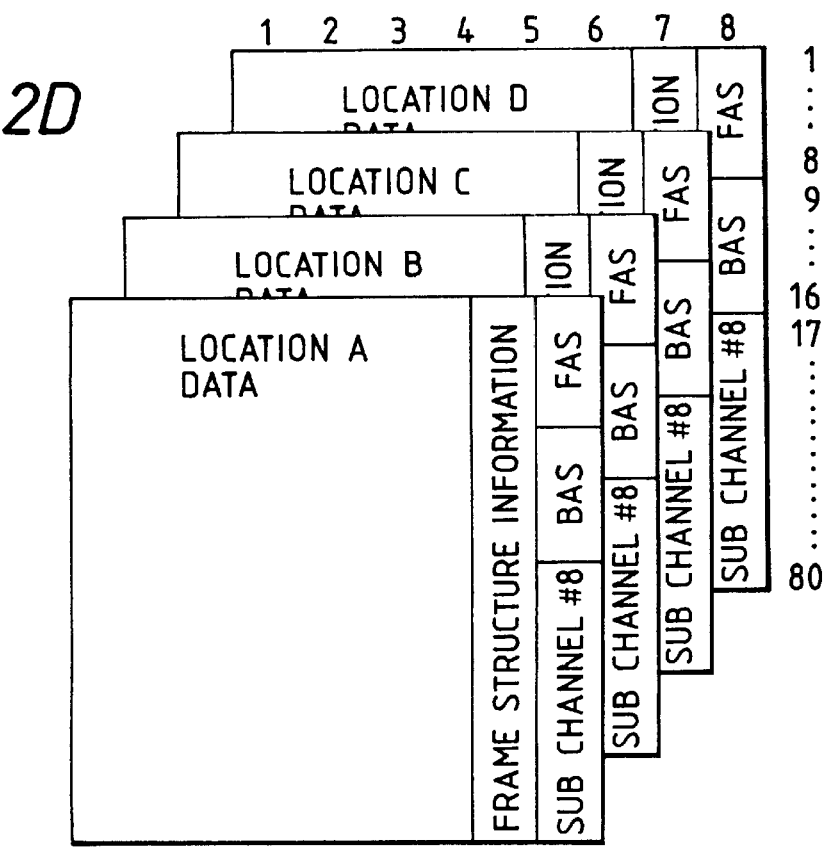

FIG. 2D shows a unique frame structure in which each frame contains data of a single location and the data of four locations can be received by the frames varying in time. FIG. 2C shows a unique frame structure in which each frame contains data of two locations and the data of four locations can be received by the frames varying in time.

Basically, the subchannel areas are assigned as the data areas for different locations, and the information of such assignment is stored in a sub-channel, thereby enabling to identify the correspondence between the sub-channel areas and the data of different locations. The multi-location data discrimination unit 12a discriminates the assignment information, and the information on such locations and the number of the locations, identified by the multi-location data discrimination unit 12a, are transmitted to the system control unit 11, which stores, in an internal RAM, the information identified by the multi-location data discrimination unit 12a, and, in response to the identified information, provides the image memory control unit 4c with the assignment of storage areas in the image memory unit 4b according to the number of locations of communication and the designation of storage areas for the received image data according to the information on locations. As a result, the data of multiple locations, either contained in a single frame or in plural frames, can be developed in the image memory unit 4b and can be displayed on the display unit 2.

The character code generation unit 11a generates, according to the control information supplied from the input unit 10, a character code of the character to be generated, for supply to the character generation unit 4g which generates a character corresponding to the code from the character code generation unit 11a, for supply to the superimposing unit 4f. The superimposing unit 4f effects display on the display unit 2 by synthesizing the character information from the character generation unit 4g with the TV signal released from the TV signal encoding unit 4d. The image size conversion unit 4e converts the image size of the image data to be displayed, according to the designation of the display size, since the display on the display unit 2 can be made with a size larger than that of the image data stored in the image memory unit 4b for example in case the image data of a single location are extracted for display from those of multiple locations. The designation of the display size is given by the system control unit 11, based on the control information supplied from the input unit 10.

Figure 3A:
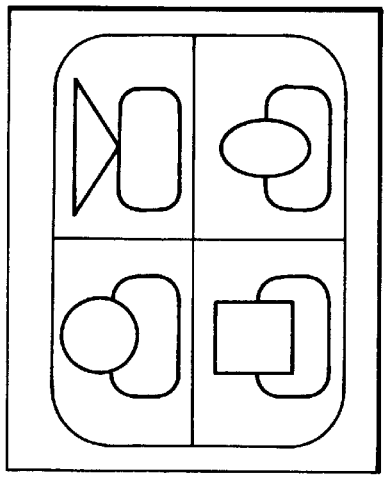
Figure 3B:
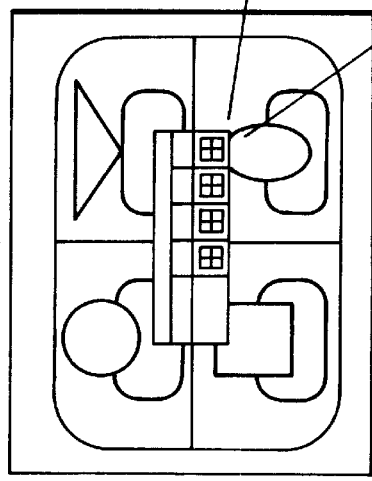

FIGS. 3A to 3G show examples of the above-explained operations. FIG. 3A shows a state of display, on the display unit 2, of all the image data of four locations stored in the image memory unit 4b. In the following there will be explained a case of varying the display mode according to the control information entered from the input unit 10. FIG. 3G shows an example of the input key of the input unit 10. At first, a display setting mode is started by the actuation of an "ENTER" key in the input unit 10 (FIG. 3B). In response to the actuation of the "ENTER" key, a display mode window, stored in advance in the character code generation unit, is generated by the character generation unit 4g and pops up, in superimposed manner, at the center of the image frame of the display unit 2. This operation is based on the functions of the character code generation unit 11a, the character generation unit 4g and the superimposing unit 4f.

Figure 3C:
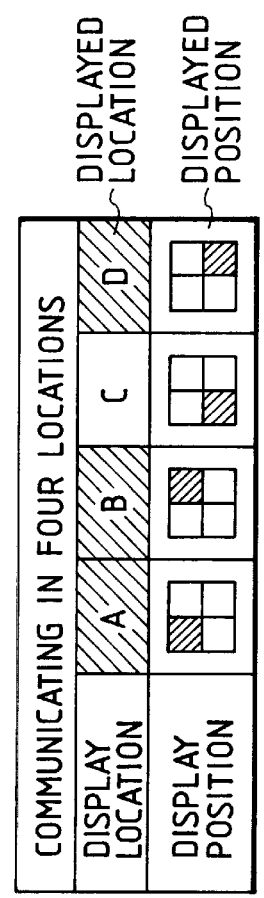

In such displayed image, a cursor is moved by arrow keys of the input unit 10 or by the mouse to a position, corresponding to the desired change in display, in the display mode setting window. FIG. 3C shows a case of displaying the image data of three locations only other than the location C, wherein the cursor is moved to a position corresponding to the location C and the display is inverted by a "SPACE" key of the input unit 10 whereby the display of the location C is not selected. After the above-explained setting the display mode is fixed by the "ENTER" key. Thus, there is adopted a display mode for the locations A, B and D only as shown in FIG. 3D. FIG. 3E shows a case of not selecting, in the state in FIG. 3B, the displays for the locations A, B and C. In such case the system control unit 11 discriminates that the data of the location D alone is displayed and sends a control command to the video output interface unit 4 whereby the image size conversion unit 4e to double the image size in the horizontal and vertical directions, for display on the display unit 2, as shown in FIG. 3F.

As explained in the foregoing, the communication terminal of the present embodiment can display, among the received image data of multiple locations, those of an arbitrary location on the display means according to the information entered from the input means, and, in case of multi-location communication in which the image data of multiple locations are received in plural frames, it can not only display the image data of an arbitrary location according to the information entered from the input means but also display the image data of the multiple locations collectively on the display means. The terminal can furthermore display the image transmitted therefrom, in selective manner.

As a result, in the multi-location communication, the user can arbitrarily select the display mode such as magnified display of the image data of a desired location only or collective display of the image data of all the locations, so that the user interface in the communication can be significantly improved.

[Second embodiment]

In the following there will be explained a second embodiment of the present invention, with reference to the attached drawings.

Figure 9:
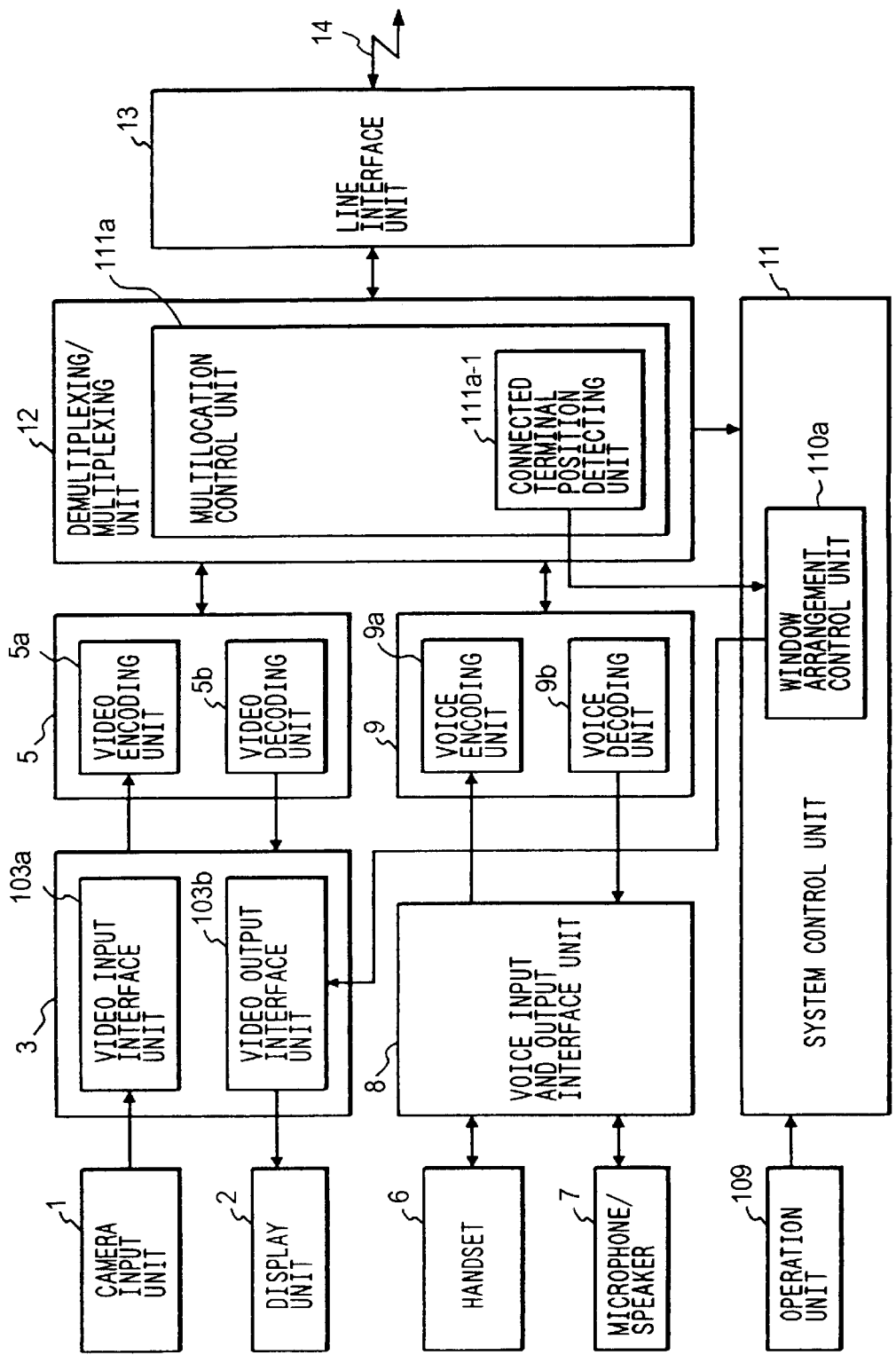
FIG. 9 is a block diagram showing the schematic configuration of a communication terminal constituting a second embodiment of the present invention.

FIG. 9 is a schematic block diagram of a communication terminal apparatus constituting an embodiment of the present invention. The present embodiment-will be explained by an example of a television conference terminal.

The multi-location television conference terminal is provided with a camera 1 constituting image input means and adapted to enter the image of the user of the terminal or of a drawing; a display unit 2 for displaying plural images received from multiple other terminals and various graphic images; and a video input/output interface unit 3 connected thereto.

The video input/output interface unit 3 is composed of a video input interface unit 103a for switching the image input means according to the instruction from a system control unit 11 and for effecting input filtering, A/D conversion, image size conversion image format conversion etc.; and a video output interface unit 103b for effecting a conversion inverse to that in the video input interface unit 103a, output filtering and display window size control for the output image according to the instruction by the system control unit 11.

The video input/output interface unit 3 is connected to a video encode/decode unit 5, which, serving to encode the transmission image signal and decode the received image signal according to the ITU-TS recommendation H.261, is composed of a video encoding unit 5a and a video decoding unit 5b.

The present terminal is further provided with a handset 6 serving as voice input/output means and a microphone/speaker 7 serving as another voice input/output means, which are connected to a voice input/output interface unit 107.

The voice input/output interface unit 107 effects echo cancellation when the handset 105 or the microphone/speaker 106 is used, generation of tones such as dialling tone, busy tone, calling tone, call arrival tone, etc., and switching of the voice input/output means according to the instruction of the system control unit 11. A voice encode/decode unit 9 is connected to the voice input/output interface unit 8.

The voice encode/decode unit 108, serving to encode the transmission voice signal and decode the received voice signal according to a voice encode/decoding algorithm such as 64 kbps PCM A-low, 64 kbps PCM $\mu$-law, 64 kbps/56 kbps/48 kbps SB-ADPCM, 32 kbps ADPCM 16 kbps (for example, APC-AB) according to the instruction by the system control unit 11, is composed of a voice encoding-unit 9a and a voice decoding unit 108b.

The present apparatus is further provided with an operation unit 109, composed of a keyboard, a touch panel, a mouse, etc. to be used for entering control information for the entire control of the apparatus.

The system control unit 11, provided with a CPU, a ROM, a RAM, an auxiliary memory device, etc., monitors the state of the various units and effects control of the entire apparatus, preparation of a display image according to the state of the apparatus and execution of application programs.

The video encode/decode unit 104 and the voice encode/decode unit 9 are connected to a demultiplex/multiplexing unit 12, which multiplexes the voice signal from the voice encoding unit 9a, the image signal from the video encoding unit 5a and the control signal from the system control unit 11 in the unit of a transmission frame, and demultiplexes the received frame into constituent media, according to the ITU-TS recommendation H.221, and is provided with a multi-location control unit 111a.

The multi-location control unit 111a serves, in realizing the multi-location communication by multiplexing the data of multiple locations in a single information channel, to fit the data of the present terminal, newly entered from the camera 1, into a data area assigned therefor in the received frame, thereby achieving multiplexing of the transmission frame and to demultiplex the data of multiple locations, in the received frame, into data of respective locations.

The demultiplex/multiplexing unit 12 is connected, through a line interface unit 13, to a communication line 14. The line interface unit 13 serves to control the communication line according to the ISDN user network interface.

A window arrangement control unit 110a and a connected terminal position detecting unit 111a-1, both featuring the present embodiment, are respectively, provided in the system control unit 11 and the multi-location control unit 111a.

The connected terminal position detecting unit 111a-1 detects, from the communication frame received from the communication channel, the connected position of each television conference terminal in the loop or bus connection.

The window arrangement control unit 110a controls the arrangement of the display windows of the received and transmitted images on the monitor, according to the connected positions of the terminals detected by the connected terminal position detecting unit 111a-1.

In the following there will be explained the function of the multi-location television conference apparatus of the present embodiment.

An input image from the camera 1 is supplied through the video input interface unit 103a to the video encoding unit 5a. Also, input voice from the handset 6 or the microphone/speaker 7 is supplied through the voice input/output interface unit 8 to the voice encoding unit 108a. The input image encoded in the video encoding unit 104a, the input voice encoded in the voice encoding unit 9a and the control signal from the system control unit 11 are multiplexed in the demultiplex/multiplexing unit 12 in the unit of a transmission frame, and transmitted through the line interface unit 13 to the communication line 14.

A frame received from the communication line 14 is separated in the demultiplex/multiplexing unit 12 into the image signal, voice signal and control signal, which are respectively supplied to the video decoding unit 5b, the voice decoding unit 9b and the system control unit 11. The received image, decoded in the video decoding unit 5b, is transmitted through the video output interface unit 103b and displayed on the display unit 2, and the received voice decoded in the voice decoding unit 9b is transmitted through the voice input/output interface unit 8 and released from the handset 6 or the microphone/speaker 7.

The multi-location control unit 11a fits, for realizing the multi-location communication by multiplexing the data of multiple locations in a single information channel, the data of the present terminal, newly entered from the camera 1, into a data area, assigned to the present terminal, in the frame received in the demultiplex/multiplexing unit 12, thereby achieving multiplexing of the transmission frame, and also separates the data of the multiple locations in the received frame into the data of respective locations for enabling independent processing at each location.

The connected terminal position detecting unit 111a-1 detects, from the structure of the received frame, the connected position of each terminal in the loop or bus connection, and sends the detected information to the system control unit 11, which processes the information on the terminal positions from the detecting unit 111a-1, in the window arrangement control unit 110a for setting the window display positions of the data of the connected locations, and instructs the setting to the video output interface unit 103b.

The video output interface unit 103b displays the images of the different locations on the display unit 2, based on the window display positions of the locations determined in the window arrangement control unit 110a.

In the point-to-point communication between two locations, the display unit 2 can effect various display modes such as (1) display of the received image in the entire display area, (2) graphic display in the entire display area, with a window display of the received image therein, and (3) display of the received image and the image of the present terminal in combination, on the graphic display. It is also possible to vary the initial setting, such as the window size, by an instruction supplied from the operation unit 109 and through the system control unit 11.

In case of multi-point communication, the display unit can naturally increase the number of received images to be displayed, in addition to the display modes in case of the point-to-point communication, and automatically adjusts the arrangement of the display windows for the different locations, so as to clarify the connection state of the connected terminals.

In the present embodiment, the window arrangement control unit 110a is provided in the system control unit 11 and is realized by a software, but it may also be realized by a completely independent hardware.

Figure 10:
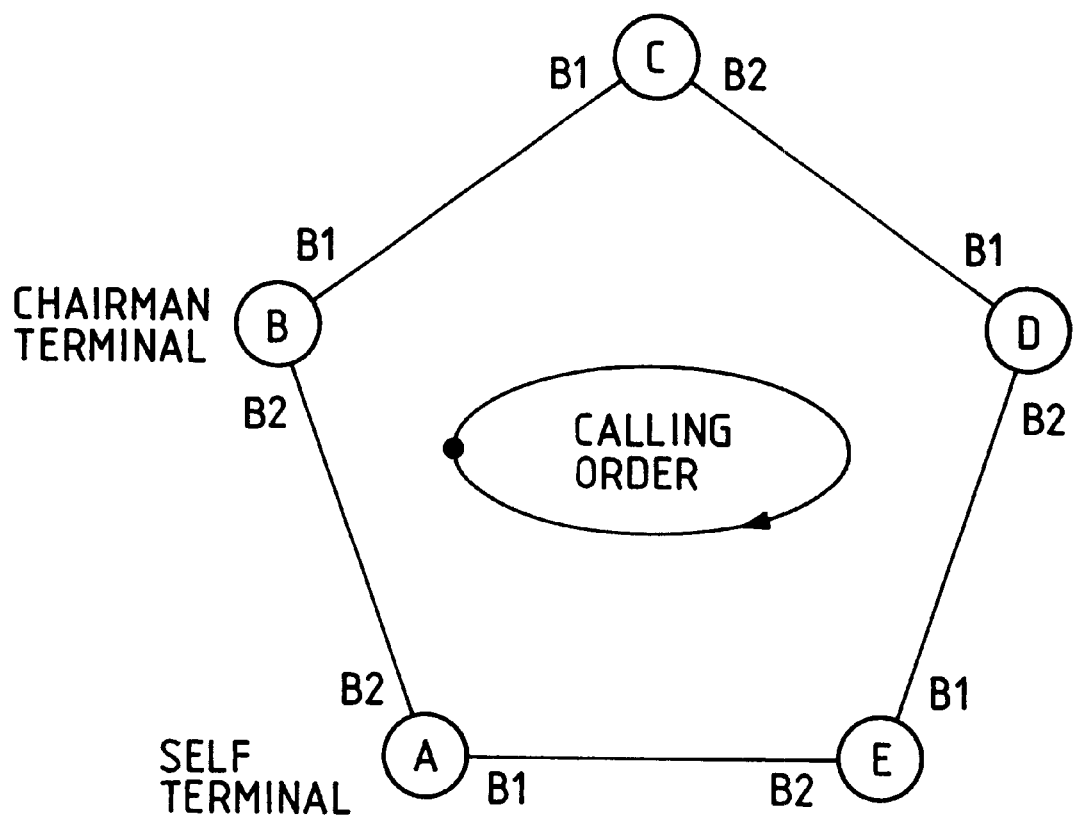
FIG. 10 is a view showing the state of connection in case of loop communication among five locations.

FIG. 10 shows the connection state in case of loop communication among five locations, wherein a television conference of five locations, is realized by connecting two information channels (B channels) of the ISDN basic interface to different television conference terminals and connecting the information channels so as to form a loop.

The subject terminal is defined as the terminal A, and terminals E and B are connected respectively to the B1 and B2 channels of the terminal A. Thus, the terminal A receives the data of the terminals D and E by the B1 channel, and the data of the terminals B and C by the B2 channel.

In the following there will be explained an example of calling method in the multi-point communication. The control operation explained in the following are executed by the system control units of the respective terminals.

At first, there is defined a chairman terminal, which is the terminal B in the illustrated example. The chairman terminals makes a call to the first terminal through the B1 channel. In this operation, the telephone numbers of the plural locations to be communicated are arranged in the order of connection thereof, with the telephone number of the chairman terminal itself at the last, and these data together with a 5-point loop communication command are transmitted, for example by the user area of a D-channel packet.

Upon receiving the data from the terminal B through the B1 channel, the terminal C identifies the 5-point loop communication from the above-mentioned telephone numbers and searches its own telephone number (of the terminal C) in the ensuing telephone numbers, and makes a call to a terminal of the telephone number positioned next to the own telephone number, through the B2 channel. The terminals repeat the reception of call by the B1 channel and the call by the B2 channel according to the transmitted telephone numbers, and the connections among multiple locations are completed by a call from the 5th terminal (terminal A in the illustrated example) to the chairman terminal.

In the following there will be given an explanation on the connected terminal position detecting unit 111a-1. Each terminal stores, in the RAM of the system control unit, the telephone numbers of other terminals, transmitted at the initial multi-point connecting sequence, and, at the data transmission, it puts its own telephone number in the header, in order to enable identification of the terminal (cf. FIG. 11). The connected terminal position detecting unit 111a-1 detects the source terminal of the received data by recognizing the telephone number in the header and comparing the telephone number with the telephone numbers memorized at the multi-point connecting sequence, and sends an identification number to the window arrangement control unit 110a.

In the following there will be explained the window arrangement control unit 110a. The system control unit 11 compares the position of its own telephone number relative to the telephone numbers of other terminals, memorized in the multi-point connecting sequence, thereby making correspondence between the terminals of respective telephone numbers and the terminal positions B, C, D, E shown in FIG. 10.

In response to the signal indicating the telephone number of the source terminal of the received data, from the connected terminal position detecting unit 111a-1, the window arrangement control unit 110a provides the video output interface unit 103b with a control signal indicating the display position for the received data on the display unit 2, among the display positions pre-assigned for the terminals B, C, D and E.

Figure 11:
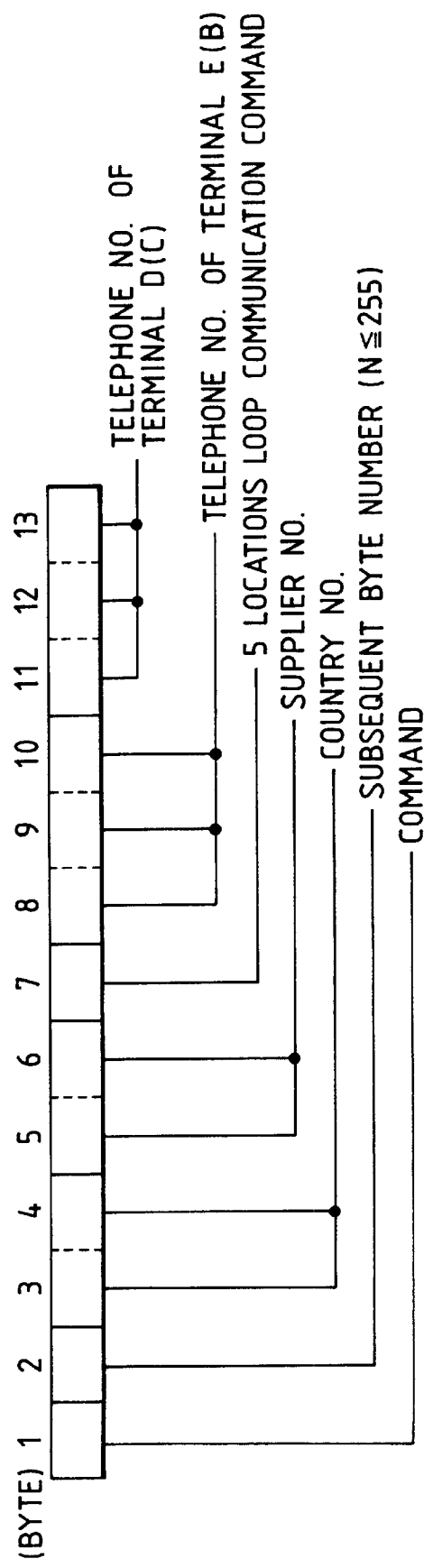
FIG. 11 is a view showing an example of the frame configuration for recognizing the connected position of the terminal.

FIG. 11 shows an example of the frame configuration for enabling the detecting unit 111a-1 to identify the connected positions of the terminals. This corresponds to the message format in case the frame is realized, in the frame structure provided in the ITU-TS recommendation H.221, by the non-ITU-TS standard command message (BAS(111)[31]) in the escape table.

The first byte represents a non-ITU-TS standard command message of the escape table, wherein:

(b0, b2, b3, b4, b5, b6, b7)=(1,1,1,1,1,1,1,1).

The second byte indicates the number of bytes (255 at maximum) ensuing after the third byte. The third and fourth bytes represent the country number, and the fifth and sixth bytes represent the number of provider. However, the third byte follows the recommendation T.35, and the fourth, fifth and sixth bytes are designated in each country. The seventh byte is a "5-point communication command" indicating the communication. among five locations, the eighth byte is "telephone number of terminal B (terminal E in case of the B2 channel", and the ninth byte is "telephone number of the terminal C (terminal D in case of the B2 channel)". The actual image and voice data are received in the data areas pre-assigned for the terminals B (E) and C (D) within the data area of the B channel.

As explained in the foregoing, FIG. 11 provides a method of recognizing the positions of the connected terminals by the non-ITU-TS standard command message in the escape table provided in the frame structure according to the ITU-TS recommendation H221. Such recognition of the connected positions in the multi-location communication may also be achieved for example by the user area of the D channel packet.

Figure 12:
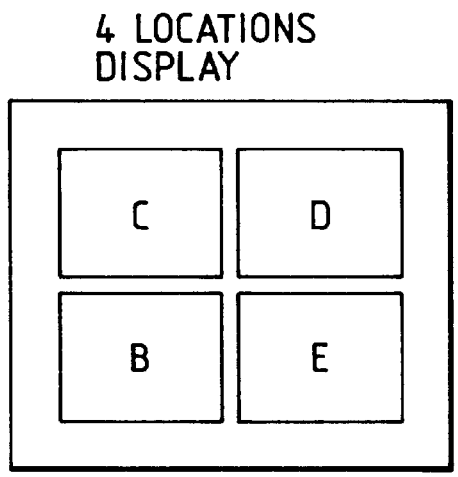
FIG. 12 is a view showing an example of display on the display unit 2.

FIG. 12 shows an example of the display on the display on the display unit 2. For clarifying the state of connection, the data of the terminals B, C, D and E are displayed in the clockwise order, starting from the lower left corner, and, in this manner the user can easily understand that the B1 and B2 channels of his own terminal are respectively connected to the terminals E and B.

It is, therefore, possible to know, in advance, the terminal to be called, in case the line connection is erroneously cut off by an error in the own terminal, such as hook-on, and has to be restored. In the following there will be explained the operations in case the terminal D is disconnected.

Figure 13:
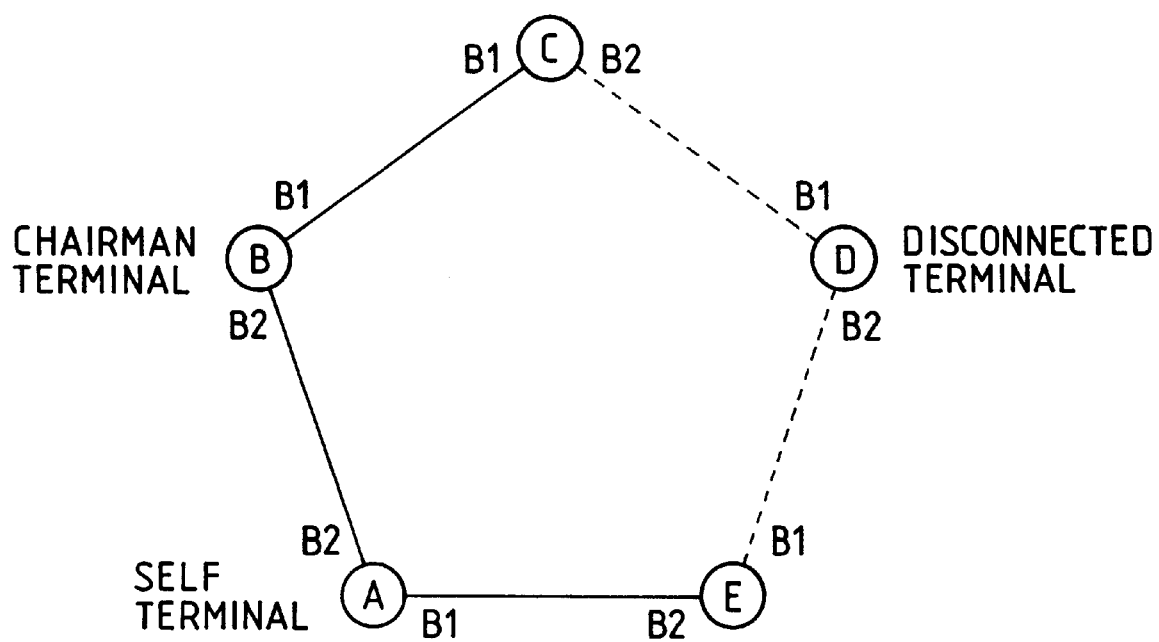
FIG. 13 is a view showing the state of line connection when a terminal D is disconnected.
Figure 14:
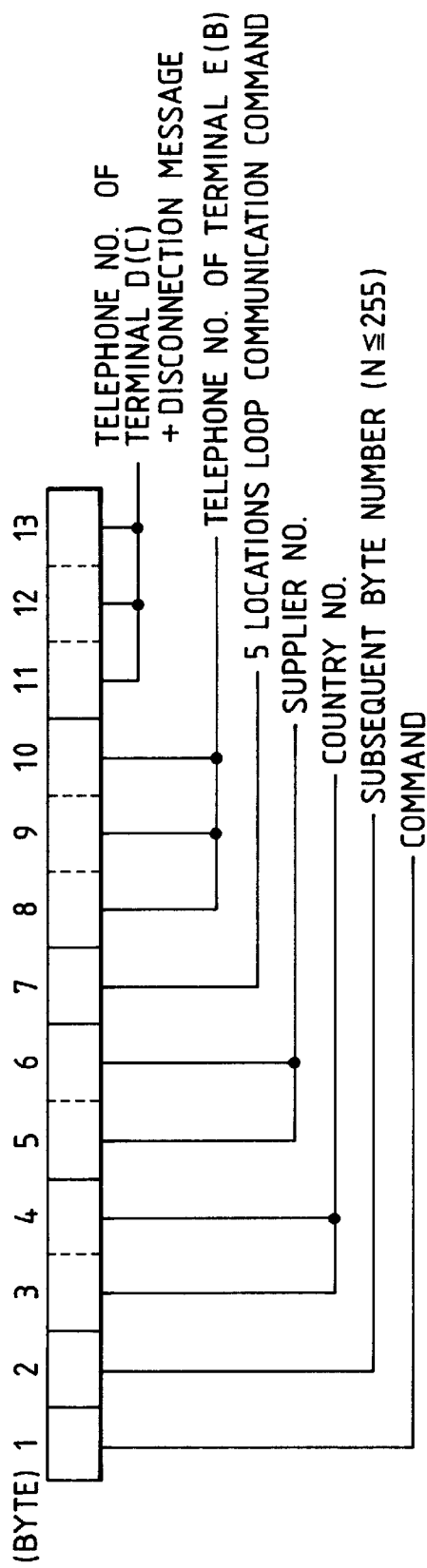
FIG. 14 is a view showing an example of the frame configuration for recognizing the connected position of the terminal.

When the terminal D is disconnected, the terminals C and E recognize such disconnection, as the B2 channel of the terminal C and the B1 channel of the terminal E are also cut off (cf. FIG. 13). The disconnection of the terminal D is also recognized by the terminal A through the data received from the terminal E and by the terminal B through the data received from the terminal C (cf. FIG. 14). Having thus recognized the disconnection of the terminal D, the system control unit 11 of each terminal informs the user thereof of such disconnection, for example by broken-lined display of the outer frame for the terminal D (cf. FIG. 15).

As a result, restoration of the multi-location connection after the disconnection of the terminal D is facilitated. For example, if the disconnection is by an error, the disconnected terminal may be called again by the system control units 11 of the adjacent terminals thereto, by the telephone number stored in the RAM's of the system control units at the initial multi-location connecting sequence, or there can be waited the calls from the disconnected terminal to the adjacent ones. On the other hand, if the disconnection is for normal withdrawal from the conference, there is required restoration of the multi-location connection among the remaining terminals, and such restoration may be achieved for example by a call from a terminal positioned upstream of the withdrawing terminal (a terminal adjacent to the withdrawing terminal in the conterclockwise direction) to a terminal positioned downstream of the withdrawing terminal, or by a procedure instructed by the chairman terminal.

The present embodiment has been explained by a television conference apparatus, but the present invention is not limited to such embodiment and is likewise applicable to an apparatus for telephone conference, utilizing the voice only. In such case each terminal may be provided with a display device exclusive for indicating the state of connection.

Figure 15:
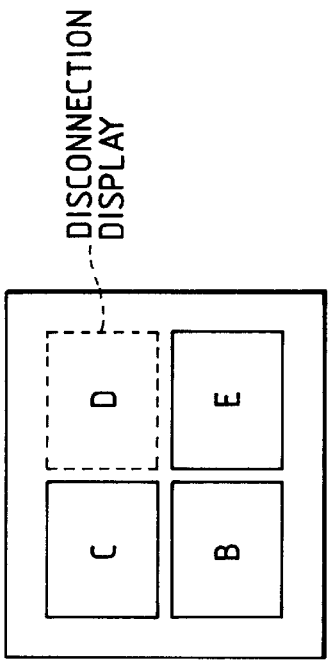
FIG. 15 is a view showing an example of the display on the display unit when a terminal D is disconnected.

The present embodiment adopts the display format as shown in FIGS. 12 and 15, but there may also be employed other display formats, for example as shown in FIGS. 10 and 13, as long as the state of connection of the terminals can be identified.

As explained in the foregoing, the present embodiment allows the operator of each terminal to know the state of connection among the terminals, by merely looking at the display unit.

Consequently the operator can know, in advance, to which terminals the connection is to be made again in case he disconnects the terminal by an error. Also, in case another terminal disconnects the line by an error, it is possible to know which terminal should made a call to the disconnected terminal. Furthermore, in case a terminal effects disconnection for withdrawing from the conference, it is possible to know the terminals between which a call is required in order to restore the multi-location television conference thereafter. In summary, in case disconnection of a terminal occurs in the course of the multi-location communication, there can be facilitated the measure for restoring the multi-location connection thereafter.

In the foregoing there has been explained a method of facilitating the restoration of the line connection, in case of an erroneous line disconnection. In the following there will be explained a method for preventing erroneous line disconnection, resulting from an erroneous off-hook operation at the withdrawal from the multi-location conference.

Figure 16:
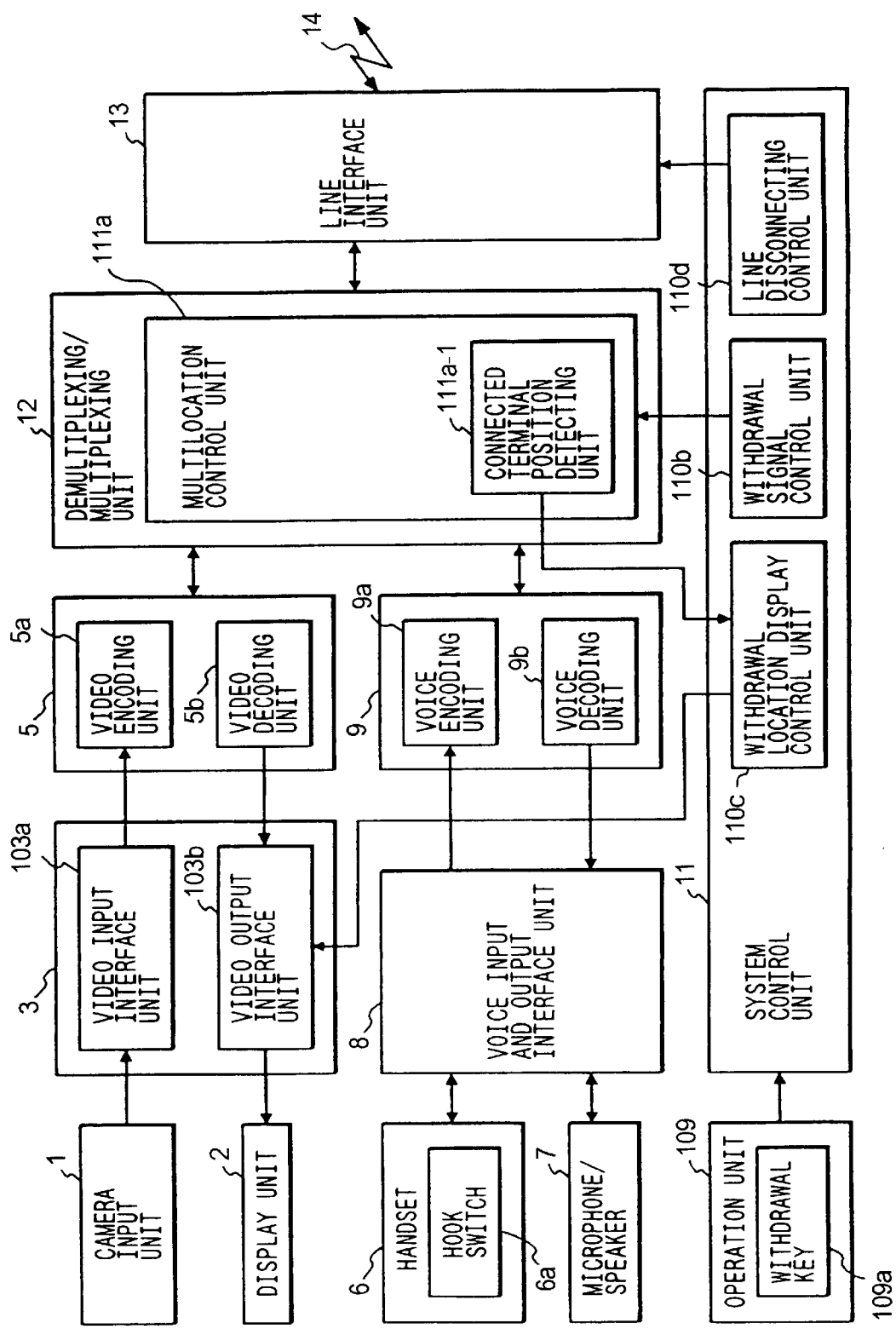
FIG. 16 is a block diagram of a multi-point communication terminal constituting an embodiment of the present invention.

FIG. 16 is a block diagram of a communication terminal, wherein the same components as those in FIG. 9 are represented by the same numbers. The configuration shown in FIG. 16 is different from that in FIG. 9 in being further provided with a withdrawal key (withdrawal signal input means) 109a, a line disconnection control unit (line disconnection control means) 110d, a withdrawal signal control unit (withdrawal signal control means) 110b, and a withdrawal location display control unit (withdrawal location display control means) 110c.

The withdrawal key 109a is provided in the operation unit 109 and is actuated at the withdrawal, thereby generating a withdrawal signal. The line disconnection control unit 110d is provided in the system control unit 11 and effects line disconnection control in the multi-location communication. The withdrawal signal control unit 110b, also provided in the system control unit 11, effects transmission control for the withdrawal signal in the multi-location communication. The withdrawal location display control unit 110c effects control relating to the display of the withdrawing location, according to the received information on said location.

The basic function of the above-mentioned terminal is same as the aforementioned function of the communication terminal shown in FIG. 9. Also, the data communication process among the communication terminals at multiple locations is same as that in case of the above-mentioned communication terminal.

Figure 17:
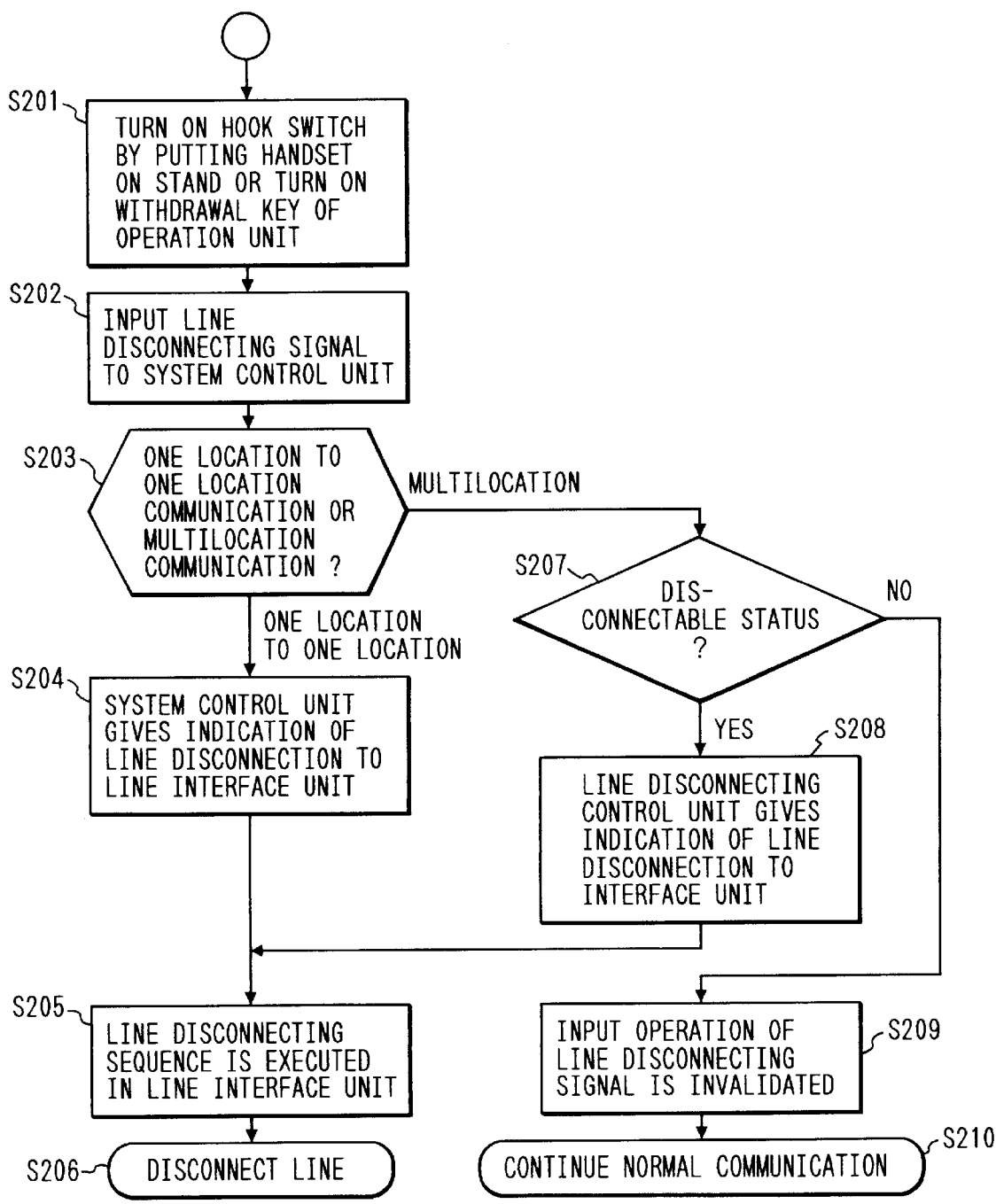
FIGS. 17 to 19 are flow charts showing the control sequence for line disconnection in the multi-point communication terminal.

In the following there will be explained the line disconnecting process, with reference to flow charts shown in FIGS. 17 to 19. In an operation mode of placing the handset 6 on a stand, a hook switch 6a of the handset 6 is turned on, and a turn-on signal is transmitted through the voice input/output interface unit 8 (step S201) and supplied as a line disconnection signal to the system control unit 11 (step S202). Otherwise, in an operation mode of turning on a line disconnection key (withdrawal key) provided in the operation unit 109 (step S201), the line disconnection signal is supplied to the system control unit 110 (step S202). Then the communication is identified as in the point-to-point mode (step S203), and the system control unit 11, having received the line disconnection signal, provides the line interface unit 13 with a disconnecting instruction (step S204). Having received the instruction, the line interface unit 13 executes a line disconnecting sequence (step S205) whereby the line is disconnected (step S206).

On the other hand, in case of line disconnection in the course of communication by the multi-point communication terminals among multiple locations, the line disconnection signal is supplied, for example by placing of the handset 6 on the stand or by actuation of the line disconnection switch of the operation unit 109 (step S201), to the system control unit 11 (step S202). The line disconnection control unit 110d in the system control unit 11 discriminates whether a withdrawal operation, to be explained later, is already conducted and the line disconnection is thus rendered possible (step S207). If the line disconnection is identified as possible at the reception of the line disconnection signal by the system control unit 11, the line disconnection control unit 110d provides the line interface unit 13 with a disconnecting instruction (step S208), and the line interface unit 13 executes a line disconnecting sequence (step S205), whereby the line is disconnected (step S206).

However, if the line disconnection control unit 110d is incapable of line disconnection at the reception of said line disconnection signal by the system control unit 11, said control unit 110d does not give the disconnecting instruction to the line interface unit 13 in response to said line disconnection signal but invalidates the entry of said line disconnection signal (step S209), thereby continuing the normal communication (step S210). Said state, capable of disconnection, of the line disconnection control unit 110d will be explained later with reference to FIG. 19.

In the course of multi-location communication, the intention of withdrawal is usually transmitted at first by voice to other locations. After the withdrawal is approved, a withdrawing operation is executed prior to the entry of the line disconnection signal.

Figure 18:
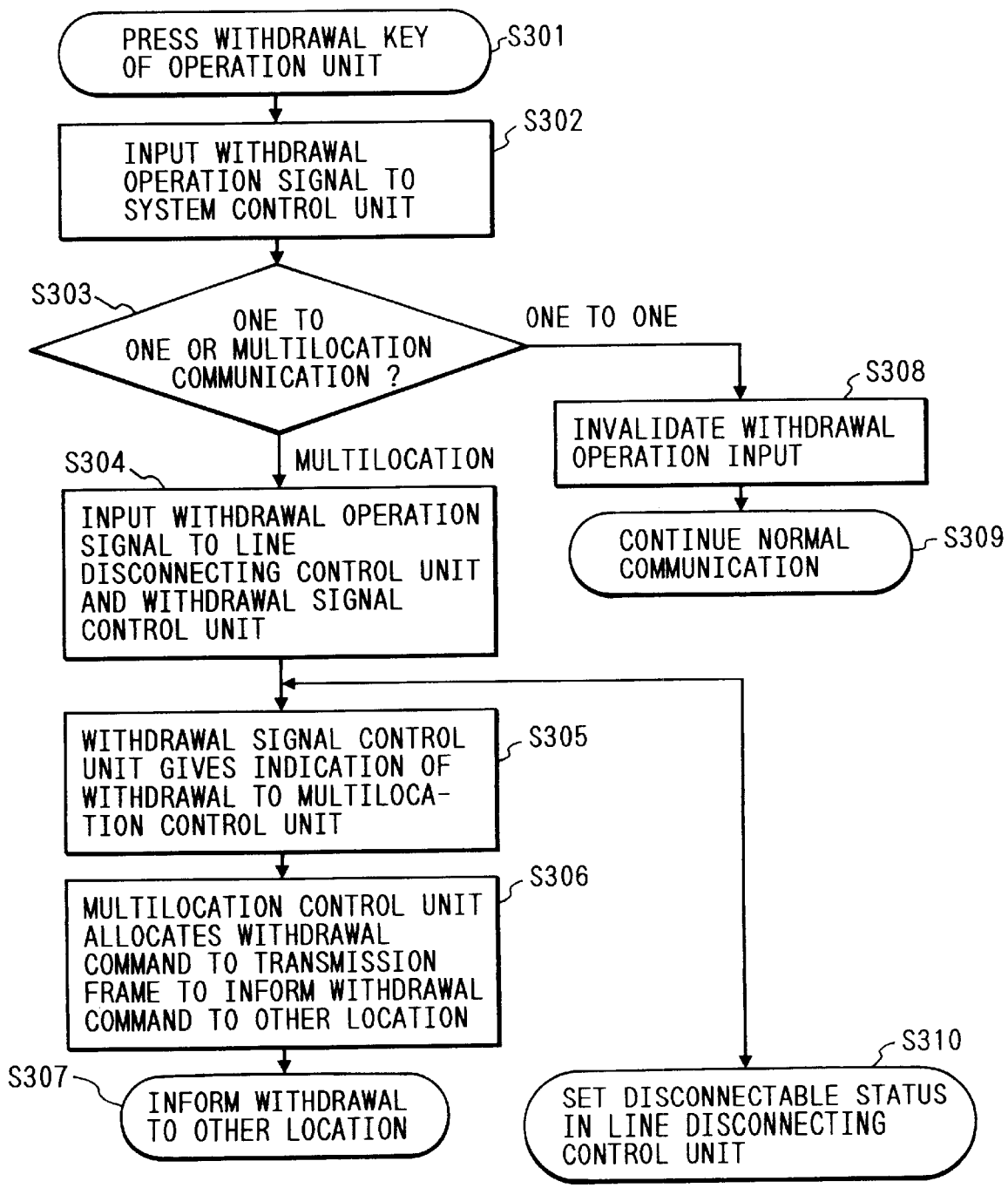

FIG. 18 is a flow chart showing the control sequence of the withdrawing operation, which is started by the actuation of the withdrawal key 109a of the operation unit 109 (step S301), whereby a withdrawal signal is supplied to the system control unit 11 (step S302). The withdrawal signal control unit 110b in the system control unit 11 receives said withdrawal signal (steps S303, S304) and sends a withdrawing instruction to the multi-location control unit 111a (step S305), which, in response, assigns a withdrawal command (withdrawal signal) in the transmission frame for multiple locations, in order to inform other locations of the withdrawal (step S306). As a result, the withdrawal is informed to other locations (step S307).

In case of point-to-point communication (step S303), the withdrawing operation is invalidated (step S308) and the normal communication is continued (step S309).

The withdrawal signal is transmitted also to the line disconnection control unit 110d in the system control unit 11 (step S304), and, upon reception of the withdrawal signal, the line disconnection control unit 110d reaches a state capable of disconnection (step S310).

Figure 19:
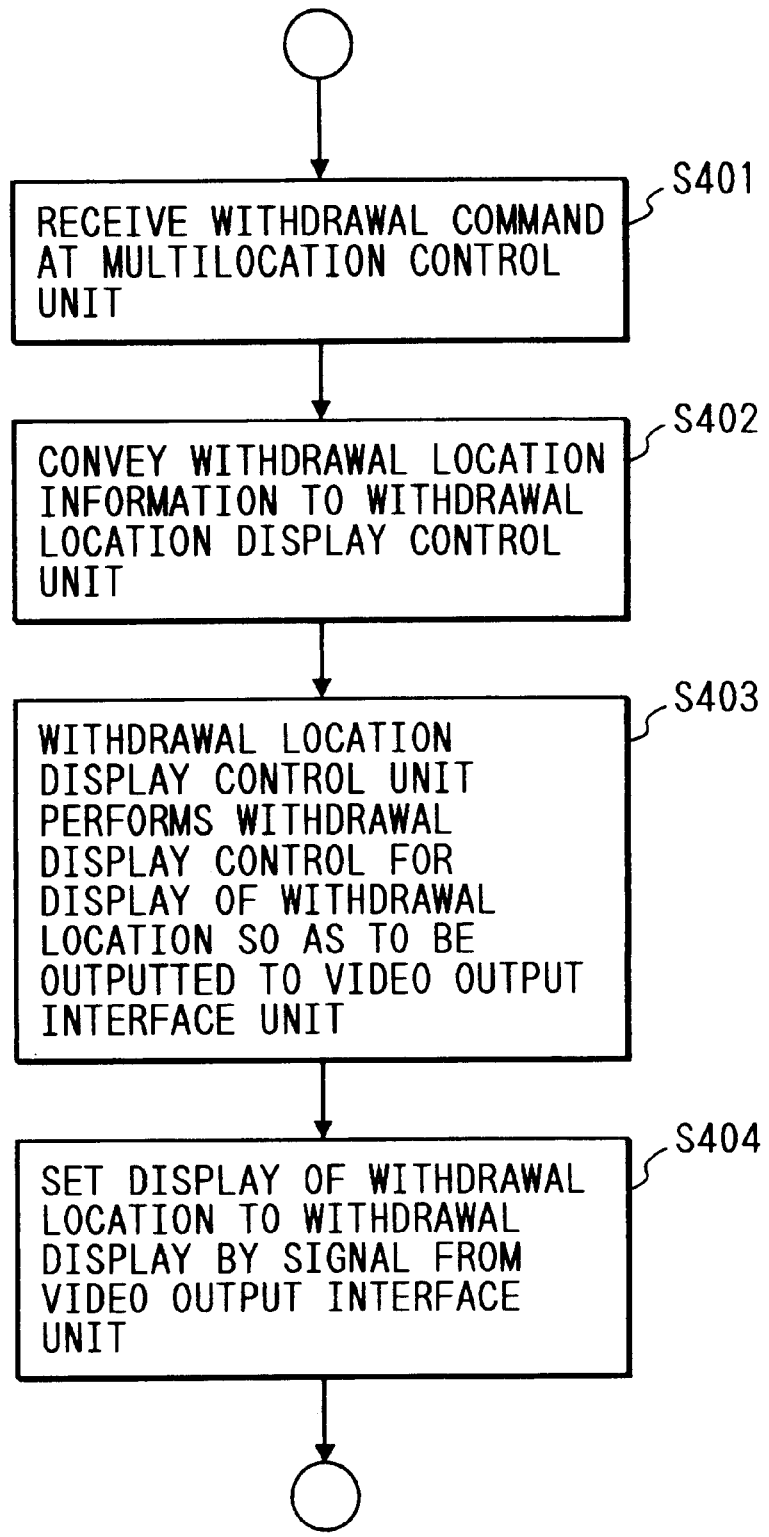

FIG. 19 is a flow chart showing the control sequence when the withdrawal command is received. In the communication terminal of another location, the multi-location control unit 111a recognizes the withdrawal command in the received frame (step S401) and provides the withdrawal location display control unit 110c of the system control unit 11 of the withdrawal location information indicating the location of the withdrawing terminal (step S402). In response to the information, the display control unit 110c provides the video output interface unit 103b with a display control signal, for effecting "withdrawal display" control on the current display for the withdrawing terminal (step S403). In response to the display control signal, the video output interface unit 103b varies the content of display on the display unit 102 (step S404). In case other multi-location communication terminals are displayed on the display unit, the withdrawing location may be indicated, for example, by a white frame attached to the current display window of the withdrawing location, by intermittent flashing of the frame, or by inversion of the display window.

As explained in the foregoing, the present embodiment disables the line disconnecting function in the course of normal multi-location communication, and, in case of a withdrawal from the multi-location communication, a withdrawing operation is executed by the signal input means prior to the line disconnection whereupon the line disconnecting function is enabled. It is, therefore, rendered possible to avoid erroneous line disconnection in the course of multi-location communication, thereby preventing the confusion in the communication among the multiple locations after such erroneous line disconnection.

Also, at the withdrawal of a location, in response to the reception of the withdrawal signal, such withdrawal is clearly indicated in the display window for said withdrawing location on the display unit, whereby the withdrawing location in the course of multi-location communication can be visually confirmed in advance.

Although the present embodiment has been explained by an example of television conference, the present invention is not limited to the television conference terminal but is naturally applicable likewise to various communication terminal apparatus. Also, the present invention is not limited to the foregoing embodiments but is subject to various modifications within the scope and spirit of the appended claims.

What is claimed is:

1. A communication terminal apparatus comprising:
   receiving means for receiving image data from multiple communication terminal apparatuses connected in a route defined by the order of connection of the multiple communication terminal apparatuses;
   displaying means for displaying a multiimage composed of the image data received by said receiving means; and
   recognizing means for recognizing connection forms, including the relative position of each communication terminal apparatus in the route, among the communication terminal apparatuses included in said multiple communication terminal apparatuses,
   wherein the displaying positions of images constituting the multiimage on said displaying means are determined according to the recognition by said recognizing means so as to display the relative position of each communication terminal apparatus in the route.

2. An apparatus according to claim 1, wherein the multiple communication terminal apparatuses transmit information specifying which of the multiple communication terminal apparatuses is a source of which image data.

3. An apparatus according to claim 1, wherein, in response to disconnection of said apparatus from any of the multiple communication terminal apparatuses, the display of the image data from the disconnected one of the multiple communication terminal apparatuses is erased on said display means.

4. An apparatus according to claim 3, wherein the display is continued for the image data other than the image data which had been coming from the disconnected one of the multiple communication terminal apparatuses.

5. An apparatus according to claim 1, wherein the connection forms are connecting relationships.

6. An apparatus to claim 1, wherein the connection forms are relationships in which the multiple communication terminal apparatuses are directly connected to other of the multiple communication terminal apparatuses.

7. An apparatus according to claim 1, further comprising connection means for performing, after line disconnection, a reconnection process on the basis of a configuration relation of communication lines connecting the multiple communication terminal apparatuses recognized by said recognizing means.

8. A communication method for use in a communication terminal apparatus, comprising the steps of:
   receiving image data from multiple communication terminal apparatuses connected in a route defined by the order of connection of the multiple communication terminal apparatuses;
   displaying on display means a multiimage composed of the received image data; and
   recognizing connection forms, including the relative position of each communication terminal apparatus in the route, among the communication terminal apparatuses included in the multiple communication terminal apparatuses,
   wherein the displaying positions of images constituting the multiimage on the displaying means are determined according to the recognition in said recognizing step so as to display the relative position of each communication terminal apparatus in the route.

9. A communication method according to claim 8, wherein the image data is data from which an image is picked up by an image pick up means at the multiple communication terminal apparatuses.

10. A communication method according to claim 9, wherein the multiple communication terminal apparatuses transmit information specifying which of the multiple communication terminal apparatuses is a source of which image data.

11. A communication method according to claim 8, wherein, in response to disconnection of said apparatus from any of the multiple communication terminal apparatuses, the display of the image data from the disconnected one of the multiple communication terminal apparatuses is erased on said display means.

12. A communication method according to claim 11, wherein the display is continued for the image data other than the image data which had been coming from the disconnected one of the multiple communication terminal apparatuses.

13. A method according to claim 8, wherein the connection forms are connecting relationships.

14. A method according to claim 8, wherein the connection forms are relationships in which the multiple communication terminal apparatuses are directly connected to other of the multiple communication terminal apparatuses.

15. A method according to claim 8, further comprising the step of performing, after line disconnection, a reconnection process on the basis of a configuration relation of communication lines connecting the multiple communication terminal apparatuses recognized in said recognizing step.

16. A communication terminal apparatus comprising:
- a receiver that receives image data from a plurality of communication terminals connected in a route defined by the order of connection of the plurality of communication terminals;
- a recognizer that recognizes connection forms, including the relative position of each communication terminal in the route, among the communication terminals included in the plurality of communication terminals; and
- a display that displays a multiimage composed of the image data received by said receiver, the display positions of images constituting the multiimage being determined according to a recognition result by said recognizer so as to display the relative position of each communication terminal in the route.

17. A communication method for use in a communication terminal, comprising the steps of:
- receiving image data from a plurality of communication terminals connected in a route defined by the order of connection of the plurality of communication terminals;
- recognizing connection forms, including the relative position of each communication terminal in the route, among the communication terminals included in the plurality of communication terminals; and
- displaying a multiimage composed of the image data received by said receiver, the display positions of images constituting the multiimage being determined according to a recognition result by said recognizer so as to display the relative position of each communication terminal in the route.

* * * * *

UNITED STATES PATENT AND TRADEMARK OFFICE
CERTIFICATE OF CORRECTION

PATENT NO. : 6,549,178 B2
DATED : April 15, 2003
INVENTOR(S) : Hitoshi Yasuda

It is certified that error appears in the above-identified patent and that said Letters Patent is hereby corrected as shown below:

Column 6,
Line 22, "according-to" should read -- according to --.

Column 8,
Line 37, "embodiment-will" should read -- embodiment will --.

Column 9,
Line 9, "108," should read -- 9, --;
Line 15, "encoding-unit" should read -- encoding unit --; and
Line 26, "104," should read -- 5 --.

Column 10,
Line 20, "11a" should read -- 111a --.

Column 12,
Line 16, "communication." should read -- communication --.

Signed and Sealed this

Second Day of March, 2004

JON W. DUDAS
*Acting Director of the United States Patent and Trademark Office*